US010757716B2

(12) United States Patent
Starsinic et al.

(10) Patent No.: US 10,757,716 B2
(45) Date of Patent: Aug. 25, 2020

(54) MOBILE CORE NETWORK SERVICE EXPOSURE FOR THE USER EQUIPMENT

(71) Applicant: Convida Wireless, LLC, Wilmington, DE (US)

(72) Inventors: Michael F. Starsinic, Newtown, PA (US); Ahmed Mohamed, Pembroke Pines, FL (US); Qing Li, Princeton Junction, NJ (US); Rocco Di Girolamo, Laval (CA); Chonggang Wang, Princeton, NJ (US)

(73) Assignee: Convida Wireless, LLC, Wilmington, DE (US)

( * ) Notice: Subject to any disclaimer, the term of this patent is extended or adjusted under 35 U.S.C. 154(b) by 180 days.

(21) Appl. No.: 15/749,632

(22) PCT Filed: Aug. 3, 2016

(86) PCT No.: PCT/US2016/045297
§ 371 (c)(1),
(2) Date: Feb. 1, 2018

(87) PCT Pub. No.: WO2017/024005
PCT Pub. Date: Feb. 9, 2017

(65) Prior Publication Data
US 2019/0124671 A1 Apr. 25, 2019

Related U.S. Application Data

(60) Provisional application No. 62/200,305, filed on Aug. 3, 2015.

(51) Int. Cl.
*H04W 72/12* (2009.01)
*H04W 12/06* (2009.01)
(Continued)

(52) U.S. Cl.
CPC ......... *H04W 72/1205* (2013.01); *H04W 4/70* (2018.02); *H04W 12/06* (2013.01); *H04W 76/10* (2018.02)

(58) Field of Classification Search
CPC . H04W 72/1205; H04W 12/06; H04W 76/10; H04W 4/70
See application file for complete search history.

(56) References Cited

U.S. PATENT DOCUMENTS

2012/0231827 A1* 9/2012 Oroskar ............... H04W 48/20
455/509

FOREIGN PATENT DOCUMENTS

| WO | 2014/129802 A1 | 8/2014 |
| WO | 2014/210068 A1 | 12/2014 |
| WO | 2015/045223 A1 | 4/2015 |

OTHER PUBLICATIONS

OneM2M Technical Specification TS-0007 V0.3.0, "Service Component Architecture" Jun. 2014, 105 pages.
(Continued)

*Primary Examiner* — Gbemileke J Onamuti
(74) *Attorney, Agent, or Firm* — BakerHostetler

(57) ABSTRACT

A Service Capability Exposure Function for a UE (U-SCEF) may be part of the UE's operating system (OS) and expose API's to applications that allow these applications to schedule data plane communications such as periodic sensor measurements or a firmware download. The U-SCEF communicates with an EPC Interworking Service that resides in the mobile network operator's (S)Gi-LAN. The EPC Interworking Service serves as an interface between the U-SCEF and the service capabilities that are exposed by the MNO via the SCEF. The U-SCEF may provide the EPC Interworking Service with information about the UE's anticipated communication schedule and mobility status. The EPC Interworking Service uses the services that are exposed by the
(Continued)

SCEF to determine the optimal times for the UE to communicate, an optimal mobility management configuration, etc. The EPC Interworking Service negotiates a communication schedule with the EPC (SCEF) and policies on behalf of the UE (U-SCEF).

20 Claims, 21 Drawing Sheets

(51) Int. Cl.
　　*H04W 76/10*　　(2018.01)
　　*H04W 4/70*　　(2018.01)

(56) References Cited

OTHER PUBLICATIONS

OneM2M Technical Specification TS-0001 V1.6.1 "Functional Architecture" Jan. 2015, 321 pages.
Huawei, et al., 3GPP SA WG2 Meeting #108 S2-151426, "Solution update for background data transfer" Apr. 2015, 5 pages.
ETSI TS 102690 V1.1.1, Machine-to-Machine Communications (M2M), "Functional Architecture" Oct. 2011, 280 pages.
Ericsson, et al., 3GPP SA WG2 Meeting #108 S2-151237 "Predictable UE communication pattern" Apr. 2015, 6 pages.
3GPP TS24.301 V11.14.0, 3rd Generation Partnership Project, Technical Specification Group Core Network and Terminals, "Non-Access-Stratum (NAS) Protocol for Evolved Packet System (EPS)", Mar. 2015, 348 pages.
3GPP TS23.682 V14.0.0 3rd Generation Partnership Project, Techinical Specification Group Services and System Aspects, "Architecture Enhancements to Facilitate Communications with Packet Data Networks and Applications" Jun. 2016, 91 pages.
3GPP TS23.682 V13.2.0, 3rd Generation Partnership Project: Technical Specification Group Services and System Aspects; "Architecture Enhancements to Facilitate Communications with Packet Data Networks and Applications", Jun. 18, 2015, pp. 1-70.
3GPP TS23.401 V12.9.0, 3rd Generation Partnership Project; Technical Specification Group Services and System Aspects, "General Packet Radio Service (GPRS) Enhancements for Evolved Universal Terrestrial Radio Access Network (E-UTRAN Access)", Jun. 2015, 309 pages.
3GPP TR33.889 V0.5.0, 3rd Generation Partnership Project; Technical Specification Group Services and System Aspects; "Study on Security Aspects of Machine Type Communications (MTC) Architecture and Feature Enhancements", Apr. 24, 2015, 25 pages.
3GPP TR23.708 V13.0.0, 3rd generation Partnership Project: Technical Specification Group Services and Systems Aspects; "Architecture Enhancements for Service Capability Exposure" Jun. 21, 2015, pp. 1-31.
3GPP TR22.853 V2.0.0, 3rd Generation Partnership Project: Technical Specification Group Services and Systems Aspects; "Study on Service Exposure and Enablement Support (SEES) Requirements", Jun. 10, 2014, 26 pages.

* cited by examiner

MOBILE CORE NETWORK SERVICE EXPOSURE FOR THE USER EQUIPMENT

CROSS-REFERENCE TO RELATED APPLICATIONS

This Application is a National Stage Application filed under 35 U.S.C. § 371 of International Application No. PCT/US2016/045297 filed Aug. 3, 2016, which claims the benefit of U.S. Provisional Patent Application Ser. No. 62/200,305 filed Aug. 3, 2015, the disclosure of which is hereby incorporated by reference as if set forth in its entirety.

BACKGROUND

The 3rd Generation Partnership Project (3GPP) is a collaboration between groups of telecommunications associations and encompasses Radio, Core Network and Service architecture. 3GPP defines the Service Capability Exposure Function (SCEF) in the reference 3GPP TS 23.682 "Architecture enhancements to facilitate communications with packet data networks and applications". FIG. 1 is copied from this reference and shows the architecture of the SCEF 102.

The Service Capability Exposure Function (SCEF) 102 provides a means to securely expose the services and capabilities provided by 3GPP network interfaces. The SCEF 102 provides a means for the discovery of the exposed service capabilities. The SCEF 102 provides access to network capabilities through homogenous network application programming interfaces (e.g. Network API) defined by Open Mobile Alliance (OMA), Group Speciale Mobile Association (GSMA), and possibly other signaling station bodies. The SCEF 102 abstracts the services from the underlying 3GPP network interfaces and protocols. Individual instances of SCEF 102 may vary depending on what service capabilities are exposed and what Application Protocol Interface (API) features are supported. The SCEF 102 is always within the trust domain. An application can belong to the trust domain or may lie outside the trust domain.

The Reference S2-151426, "Solution Update for Background Data Transfer, Huawei, HiSilicon, NTT Docomo, Apr. 13-17, 2015" describes 3GPP's solution for allowing an Application Server/Service Capability Server (AS/SCS) to schedule a background data transfer with the network. The approach described in this reference allows the AS/SCS to schedule a data transfer with the Policy and Charging Rules Function (PCRF) 104. The PCRF 104 is able to tell the AS/SCS when to start the data transfer. The following description of FIG. 2 is adapted from reference S2-151426.

In this approach, any of the available PCRF 104 in the network serving this geographic area can make the decision about a transfer policy for background data transfer for non-roaming User Equipment (UE).

In this approach the UEs targeted for background data transfer could be served by a single PCRF 104 or could be spread across multiple PCRFs serving the same or different geographic areas.

The transfer policy is finally stored in the Subscription Profile Repository (SPR) 204 together with a transaction reference granting approval of the request. This ensures that the transfer policy is available to every PCRF responsible for a UE which is subject to this background data transfer in the future. In addition, other (or the same) PCRF can take this transfer policy into account during subsequent decisions about transfer policies for background data related to other AS.

When the AS 202 contacts the PCRF 104 for an individual UE (via the existing Rx interface) at a later point in time the AS 202 needs to also provide the reference. The reference enables the Policy and Charging Rules Function (PCRF) 104 to correlate the AS 202 request (that is related to the UE) with the transfer policy retrieved from the SPR 204 (that is related to the AS). The PCRF 104 finally triggers Policy and Charging Control (PCC) procedures according to 3GPP TS 23.203 to provide the respective policing and charging information to the Policy and Charging Enforcement Function (PCEF) 206.

The AS 202 will typically contact the PCRF 104 for the individual UEs to request sponsored connectivity for the background data transfer.

In step 1 of FIG. 2, a $3^{rd}$ party AS 202 may send a request for background data transfer for a set of UEs to the SCEF 102. The background data transfer request message contains application information, traffic information (e.g. the volume of data to be transferred per UE and the expected number of UEs), the desired time window and optionally, geographic area information. The Application Server (AS) does not provide any information about the identity of the UEs.

In step 2 of FIG. 2, the SCEF 102 authorizes the AS request. The SCEF 102 notifies the AS 202 at this point if the authorization fails.

In step 3 of FIG. 2, the SCEF 102 selects any of the available PCRFs and sends the background data transfer request to the PCRF 104 including the parameters provided by the AS. If the AS 202 provided geographic area information, the SCEF 102 transfers the geographic area to a corresponding network area (e.g. list of cell ids, TAs/RAs). A new interface is introduced for the interaction between SCEF 102 and PCRF 104 for the information exchange between AS 202 and PCRF 104 as this request is not specific to a given UE's IP-CAN session.

In step 4 of FIG. 2, the PCRF 104 queries the SPR 204 for all existing transfer policies (which may be equivalent to the request in step 3).

In step 5 of FIG. 2, the PCRF 104 determines, based on information provided by the AS 202 and other information (e.g. network policy, congestion level (if available), load status estimation of the required time window and network area, existing transfer policies) one or more recommended time windows for the AS data transfer. For each time window, the PCRF 104 optionally assigns a maximum aggregated bitrate for the set of UEs and a charging rate that will be applicable in the respective time window for the traffic that stays below the maximum aggregated bitrate. The maximum aggregated bitrate provided from PCRF 104 to SCEF 102/AS 202 is not enforced in the network.

In step 6 of FIG. 2, the PCRF 104 responds to the SCEF 102 with a reference ID identifying the approved grant and a transfer policy offer including one or more recommended time windows for the data transfer and optionally for each time window the maximum aggregated bitrate for the set of UEs and a charging rate.

In step 7 of FIG. 2, the SCEF 102 forwards the reference ID and the transfer policy offer to the $3^{rd}$ party AS. The AS stores the reference ID for the future interaction with the PCRF 104.

In steps 8-11 of FIG. 2, if the transfer policy offer contains more than one time window, the $3^{rd}$ party AS shall select one of the time windows and send another request for background data transfer message to inform the SCEF 102 and PCRF 104 about it.

If there is only one time window in the transfer policy offer, the AS 202 is not required to confirm.

In step 12 of FIG. 2, the PCRF 104 stores the reference ID and the new transfer policy in the SPR 204.

In step 4 of FIG. 2, when the AS 202 contacts the PCRF 104 at a later point in time for an individual UE (via the existing Rx interface), the AS 202 provides the reference ID. The PCRF 104 correlates the AS request with the transfer policy retrieved from the SPR 204 via the reference ID. The PCRF 104 finally triggers PCC procedures according to 3GPP TS 23.203 to provide the respective policing and charging information to the PCEF 206 for the background data transfer of this UE. The AS 202 will typically contact the PCRF 104 for the individual UEs to request sponsored connectivity for the background data transfer.

Reference S2-151237 ("Predicable UE Communication Pattern, Ericsson, NEC, Apr. 13-17, 2015) describes 3GPP's most recent solution for allowing an AS/SCS to schedule periodic communication with the network. The approach described in this reference allows the AS/SCS to schedule periodic data transfer with the network and provide the network with its expected mobility pattern. The PCRF 104 is able to tell the AS/SCS when to begin the data transfer. The following description of FIG. 3 is adapted from reference S2-151237.

The solution of FIG. 3 provides "Support of 3rd party interaction on information for predictable communication patterns". The solution described here defines a mechanism to provide relevant information of a communication pattern of a UE or a group of UE to the corresponding core network node in order to enable network resource optimizations for such UE(s).

The SCEF 102 may receive communication patterns for the data traffic and/or the mobility pattern. Examples what kind of parameters may be contained in these communication patterns (CPs) are shown in the tables below. The SCEF 102 shall be able to select Communication Pattern (CP) parameters for the core network nodes from those communication patterns.

A set of CP parameters can be standardized, but all CP parameters are optional.

TABLE 1

(Table 6.5.1.1-1 from S2-151237): Data traffic communication pattern parameter examples

| Communication pattern parameter | Description |
| --- | --- |
| 1) Periodic communication indicator | TRUE: The UE communicates periodically/False: No periodic communication, only on demand. [optional] |
| 2) Communication duration timer | Duration interval time of periodic communication [optional, may be used together with 1)] Example: 5 minutes |
| 3) Periodic time | Interval Time of periodic communication [optional, may be used together with 1)] Example: every hour |
| 4) Scheduled communication time | Time zone and Day of the week when the UE is available for communication [optional] Example: Time: 13:00-20:00, Day: Monday |
| 5) Average data volume per communication | Average data volume per communication [optional] Example: 2500 KB |

TABLE 2

(Table 6.5.1.1-2 from S2-151237): Mobility communication pattern parameter examples

| Communication pattern parameter | Description |
| --- | --- |
| 1) Stationary indication | TRUE: The UE is stationary/False: The UE is mobile [optional] |
| 2) Stationary location | UE location information for Stationary [optional for item 1 is TRUE] Example: cell-id (or location information which is able to be mapped to the cell-id in the network) |
| 3) Mobility area | Area information where the UE moves around [optional for item 1 is False] If it is not specified, the UE mobility is not restricted.. Example: list of cell-ids or TA-list (or location information which is able to be mapped to the cell-lists or Tracking Area (TA) list in the network) |
| 4) Average mobility speed | Average mobility speed for UE [optional for item 1 is False] Example: speed in km/h (or just low/middle/high speed) |

The following assumptions are made for this solution:

SCEF 102 filters and forwards CP parameters based on the received communication pattern from the $3^{rd}$ party service provider.

SCEF 102 provides the CP parameters to Home Subscriber Server (HSS) 302 which provides them to the selected appropriate functional entities (e.g. MME 304).

Only one set of CP parameters are valid at a time, i.e. if the same SCS/AS 202 or a separate SCS/AS 202 provides new CP parameters, then those override any CP parameters previously provided.

SCEF 102 provides the selected CP parameters to the HSS 302 for distribution to the MME 304 based on the communication patterns of individual UEs or groups of UEs received from the $3^{rd}$ party service provider. The signaling including CP parameters from SCEF 102 and HSS 302 is per subscriber level (as also HSS 302 to MME 304).

FIG. 3 (FIG. 6.5.1.3-1 from S2-151237) shows the signaling sequence for provisioning of CP parameters.

The $3^{rd}$ party service provider notifies the SCEF 102 about the communication pattern for the UE or group of UEs. The SCEF 102 may query the HSS 302 for additional information, authenticates & authorizes the request and then selects the CP parameters based on operator policy or configuration. The SCEF 102 provides the CP parameters to the relevant node (e.g. MME 304 via HSS 302) that initiates the network resource optimization. The interface between SCEF 102 and AS/SCS is outside the scope of 3GPP and the messages in FIG. 3 are exemplary.

The contents of this section discussing UE requested bearer resource modification is adapted from section 5.4.5 of reference 3GPP TS 23.401 ("General Packet Radio Service (GPRS) enhancements for Evolved Universal Terrestrial Radio Access Network (E-UTRAN) access").

The UE requested bearer resource modification procedure for an E-UTRAN is depicted in FIG. 4. The procedure allows the UE to request for a modification of bearer resources (e.g. allocation or release of resources) for one traffic flow aggregate with a specific QoS demand. Alternatively, the procedure allows the UE to request the modification of the packet filters used for an active traffic flow aggregate, without changing QoS. If accepted by the network, the request invokes either the Dedicated Bearer Activation Procedure, the Bearer Modification Procedure or a dedicated bearer is deactivated using the Packet Data Networks (PDN) Gateway (GW) Initiated Bearer Deactivation Procedure. The procedure is used by the UE when the UE already has a PDN connection with the PDN GW 404. A UE can send a subsequent Request Bearer Resource Modification Message before the previous procedure is completed.

In this procedure the UE signals a Traffic Aggregate Description (TAD) which is a partial Traffic Flow Template (TFT), together with a Procedure Transaction Identifier (PTI), and an EPS Bearer Identity (when the TAD operation is modify, delete or add to an existing packet filter). When the TAD operation is modify or delete, the packet filter identifiers of the TAD are the same as the TFT packet filter identifiers of the referenced Evolved Packet System (EPS) Bearer (as the concatenation of the TFT packet filter identifier and the EPS Bearer identifier represents a unique packet filter identifier within the PDN connection), for which resources are being modified. The TAD is released by the UE after it has received a TFT related to the current PTI from the network.

Steps 1, 2, and 5 of FIG. 4 are common for architecture variants with GPRS Tunnelling Protocol (GTP)-based S5/S8 and Proxy Mobile IPv6 (PMIP)-based S5/S8. The procedure steps marked (A) differ in the case that PMIP-based S5/S8 is employed and is defined in TS 23.402.

In step 1 of FIG. 4, the UE 402 sends a Request Bearer Resource Modification [Linked Bearer Id (LBI), Procedure Transaction Identifier (PTI), EPS Bearer Identity, Quality of Service (QoS), Traffic Aggregate Description (TAD), Protocol Configuration Options] message to the MME 304. If the UE 402 was in ECM-IDLE mode (where ECM stands for EPS Connection Management), this Non Access Stratum (NAS) message is preceded by the Service Request procedure.

The TAD indicates one requested operation (add, modify, or delete packet filters). If traffic flows are added, the TAD includes the packet filter(s) (consisting of the packet filter information including packet filter precedence, but without a packet filter identifier) to be added. The UE 402 also sends the QoS Class Identifier (QCI) requested and Guaranteed Bit Rate (GBR), if applicable, for the added traffic flows. If the UE 402 wants to link the new packet filter to an existing packet filter to enable the usage of existing bearer resources for the new packet filter, the UE 402 provides an existing packet filter identifier together with the new packet filter. If the UE 402 wants to change the GBR in addition, the UE 402 includes the GBR requirement of the EPS Bearer. The TAD is released when the procedure is completed.

When requesting for a modification of GBR (i.e. decrease or increase), the TAD shall include packet filter identifier(s) for which the GBR change request applies to. The UE 402 includes the GBR requirement of the EPS Bearer. The TAD is released when the procedure is completed.

When requesting a modification of a packet filter (e.g. change of port number), the TAD shall include packet filter identifier for which the change request applies to together with the changed packet filter information.

If the UE 402 requests for deletion of traffic flows, the TAD includes the packet filter identifier(s) to be deleted. If the packet filters to be deleted were mapped to a GBR Bearer, the UE 402 includes the new GBR requirement of the EPS Bearer.

The UE 402 sends the Linked Bearer Id (LBI) only when the requested operation is add, to indicate to which PDN connection the additional bearer resource is linked to. The EPS Bearer Identity is only sent when the requested operation is modify or delete. The Procedure Transaction Id is dynamically allocated by the UE 402 for this procedure. The UE 402 should ensure as far as possible that previously used PTI values are not immediately reused. The PTI is released when the procedure is completed. Protocol Configuration Options may be used to transfer application level parameters between the UE 402 and the PDN Gateway (GW) 404, and are sent transparently through the MME 304 and the Serving GW 406.

In step 2 of FIG. 4, the MME 304 sends the Bearer Resource Command [International Mobile Subscriber Identity (IMSI), LBI, PTI, EPS Bearer Identity, QoS, TAD, Protocol Configuration Options] message to the selected Serving GW 406. The MME 304 validates the request using the Linked Bearer Id. The same Serving GW address is used by the MME 304 as for the EPS Bearer identified by the Linked Bearer Id received in the Request Bearer Resource Modification message.

In step 3 of FIG. 4, the Serving GW 406 sends the Bearer Resource Command (IMSI, LBI, PTI, EPS Bearer Identity, QoS, TAD, Protocol Configuration Options) message to the PDN GW 404. The Serving GW sends the message to the same PDN GW 404 as for the EPS Bearer identified by the Linked Bearer Id.

In step 4 of FIG. 4, the PDN GW 404 may either apply a locally configured QoS policy, or it may interact with the PCRF 104 to trigger the appropriate PCC decision, which may take into account subscription information. This corresponds to the beginning of a PCEF-initiated IP-CAN Session Modification procedure as defined in TS 23.203, up to the point that the PDN GW 404 requests IP-CAN Bearer Signalling. When interacting with PCRF 104, the PDN GW 404 provides to the PCRF 104 the content of the TAD and, if applicable, the GBR change (increase or decrease) associated with the packet filter information contained in the TAD. The GBR change is either calculated from the current Bearer QoS and the requested Bearer QoS from the UE 402, or set to the requested GBR if the TAD indicates an add operation and no EPS Bearer Identity was received. If the TAD indicates an add operation, the requested QCI is also provided to the PCRF 104 unless an existing packet filter identifier is provided together with the new packet filter.

If the TAD operation is modify or delete, then the PDN GW 404 provides the Service Data Flow (SDF) filter identifier(s), previously assigned on Gx, that correspond to the received packet filter identifiers of the EPS bearer indicated by the received EPS bearer identity.

In step 5 of FIG. 4, if the request is accepted, either the Dedicated Bearer Activation Procedure (according to clause 5.4.1 of 3GPP TS 23.401 "General Packet Radio Service (GPRS) enhancements for Evolved Universal Terrestrial Radio Access Network (E-UTRAN) access"), the PDN GW Initiated Bearer Deactivation Procedure (according to clause 5.4.4.1 of 3GPP TS 23.401) or one of the Dedicated Bearer Modification Procedures (according to clause 5.4.2.1 or 5.4.3 of 3GPP TS 23.401) is invoked. The PTI allocated by the UE 402 is used as a parameter in the invoked Dedicated Bearer Activation Procedure, the PDN GW Initiated Bearer Deactivation Procedure or the Dedicated Bearer Modification Procedure to correlate it to the UE Requested Bearer Resource Modification Procedure. This provides the UE 402 with the necessary linkage to what EPS Bearer to be used for the new traffic flow aggregate. The PDN GW 404 shall not modify the QoS parameters requested by the UE 402.

The PDN GW 404 inserts, modifies or removes packet filter(s) corresponding to the TAD into the TFT for the EPS bearer. When a new packet filter is inserted into a TFT, the PDN GW 404 assigns a new packet filter identifier which is unique within the TFT. The PDN GW 404 maintains the relation between the SDF filter identifier in the PCC rule received from the PCRF 104 and the packet filter identifier of the TFT of this EPS bearer. If all of the packet filter(s) for a dedicated EPS bearer have been removed from the TFT, the PDN GW performs the PDN GW Initiated Bearer Deactivation Procedure.

If the requested QoS is not granted (i.e. the requested QoS cannot be accepted or resources could not be allocated) the PDN GW 404 sends a Bearer Resource Failure Indication (with a cause indicating the reason why the request failed or was rejected) message, which shall be delivered to the UE 402.

In step 6 of FIG. 4, if the PDN GW 404 interacted with the PCRF 104 in step 4, the PDN GW 404 indicates to the PCRF 104 whether the PCC decision could be enforced or not. This corresponds to the completion of the PCEF-initiated IP-CAN session modification procedure as defined in TS 23.203, proceeding after the completion of IP-CAN bearer signalling.

In M2M communications the Service Layer (SL) aims to enable platforms for delivery of third-party value-added services and applications by supporting secure end-to-end data/control exchange between M2M devices and customer applications and to provide capabilities for remote provisioning & activation, authentication, encryption, connectivity setup, buffering, synchronization, aggregation and device management. SL provides interfaces to the underlying networks and enables capabilities using servers owned by Service Providers (SP) accessed through third-party content providers through Application Programming Interfaces (APIs).

An M2M/IoT service layer is specifically targeted towards providing value-added services for M2M/IoT type devices and applications. Standardization bodies such as ETSI M2M ("Machine-to-Machine communications (M2M) Functional Architecture", Draft ETSI TS 102 690 1.1.1 (2011-10)) and oneM2M TS-0001 (oneM2M Functional Architecture) are developing M2M service layers specifically targeting sensor and device networks. Device Management (DM) is among the value-added services targeted by most SL platforms in order to provide solutions for issues such as firmware and software management, security and access control, device monitoring and logging, etc.

The oneM2M architecture is based on a Common Services Entity (CSE) which can be hosted on different types of network nodes (e.g. infrastructure node, middle node, application-specific node).

Within the oneM2M RESTful architecture (also known as Resource oriented Architecture or RoA) the CSE 502 supports the instantiation of a set of Common Service Functions (CSFs), as shown in FIG. 6. CSF functionality is implemented via resources which are uniquely addressable entities having a representation that can be manipulated via RESTful methods such as Create, Retrieve, Update, and Delete. These resources are addressable using Universal Resource Identifiers (URIs). A resource supports a set of attributes that store relevant information about the resource and may contain references to other resources termed child resources(s). A child resource is a resource that has a containment relationship with a parent resource and whose lifetime is limited by the parent's resource lifetime.

oneM2M is providing specifications using a Service oriented Architecture (SoA) approach ("Service Component Architecture" oneM2M-TS-0007, oneM2M Service Component Architecture-V-0.6.0) in addition to the RoA architecture introduced. The SoA architectural concept is based on considering as building blocks the functionality provided by distinct software modules and known as services. Services are provided to applications via the specified interfaces which are independent of vendor, product or technology. The SoA representation of a CSE 502 in oneM2M is shown in FIG. 7.

From a deployment perspective, FIG. 8 depicts configurations supported by the oneM2M architecture.

The following terminology is used in this context:
Application Service Node (ASN):
   An ASN contains one CSE 502 and contains at least one Application Entity (AE). As example, an ASN could reside in an M2M Device.
Application Dedicated Node (ADN):
   An ADN contains at least one AE and does not contain a CSE 502. As example, an ADN could reside in a constrained M2M Device.
Middle Node (MN):
   A MN contains one CSE 502 and contains zero or more AEs. As example, a MN could reside in an M2M Gateway.
Infrastructure Node (IN):
   IN is a Node that contains one CSE 502 and contains zero or more AEs. There is exactly one IN in the Infrastructure Domain per oneM2M Service Provider. As example, an IN could reside in an M2M Service Infrastructure.
Non-oneM2M Node (NoDN):
   A non-oneM2M Node is a Node that does not contain oneM2M Entities (neither AEs nor CSEs). Such Nodes represent devices attached to the oneM2M system for interworking purposes, including management.

SUMMARY

A Service Capability Exposure Function is added to the UE (U-SCEF). The U-SCEF may be part of the UE's operating system (OS) and expose API's to applications that allow these applications to schedule data plane communications such as periodic sensor measurements or a firmware download. Alternatively, the U-SCEF could be an application or service that sits above the UE's OS.

The U-SCEF communicates with an Evolved Packet Core (EPC) Interworking Service that resides in the mobile network operator's (S)Gi-LAN. The EPC Interworking Service serves as an interface between the U-SCEF and the service capabilities that are exposed by the Mobile Network Operator (MNO) via the SCEF. The U-SCEF may provide the EPC Interworking Service with information about the UE's anticipated communication schedule and mobility status. The EPC Interworking Service will use the services that are exposed by the SCEF to determine the optimal times for the UE to communicate, an optimal mobility management configuration, etc. Note that the U-SCEF may also communicate with a service that Interworks with other types of core networks such as a General Packet Radio Service (GPRS) based core network.

The EPC Interworking Service negotiates a communication schedule with the EPC (SCEF) on behalf of the UE (U-SCEF) and provides the U-SCEF with a communication policy or mobility management policy to match the needs of the UE and the mobile network.

The procedures allow the UE applications to negotiate communication schedules and mobility management configurations, directly with the MNO. The Servers that the UE Applications communicate with, do not need to support an interface with the MNO or establish a business relationship with the MNO. The Servers can be largely unaware of the negotiation between the UE and MNO.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein.

DETAILED DESCRIPTION OF ILLUSTRATIVE EMBODIMENTS

Sometimes device characteristics change during run time. An event that causes some characteristic to change may occur at the UE 402. For example, a user may change a setting on a UE application that causes the UE's schedule, priority, etc. to change.

The UE 402 has almost no ability to inform the network about its operational characteristics. Thus, the network is not always able to take advantage of the fact that some devices are known to be stationary, communicate at known times, etc. One exception is that a NAS message could be used to indicate that the device is low priority. Another exception is that an RRC message could be used to convey a low power preference indicator. However, it is not reasonable to convey information such as communication schedule, anticipated mobility (or lack thereof), battery levels, etc. all in 3GPP control messages.

In release 13, 3GPP is working on adding interworking capabilities between the SCS and the EPC (via the SCEF 102). This type of interworking, where services, functions, or nodes are exposed, may also be called service exposure. Some of the interworking features will allow the SCS to inform the EPC about the UE's operational characteristics. However, these features are only enabled for SCS's that have a business relationship with the MNO. Thus, unless it is paired with an SCS that has a business relationship with the MNO, the UE 402 may be aware of it schedule, anticipated mobility (or lack thereof), battery levels, etc. but has no way of conveying the information to the EPC. It is expected that large numbers of devices will communicate with M2M Servers that do not have business relationships with the MNO. Thus, these types of devices may be forced to listen to the network more often, transmit at times when the network is relatively congested, or perform mobility management procedures more often than necessary.

Figure 1:
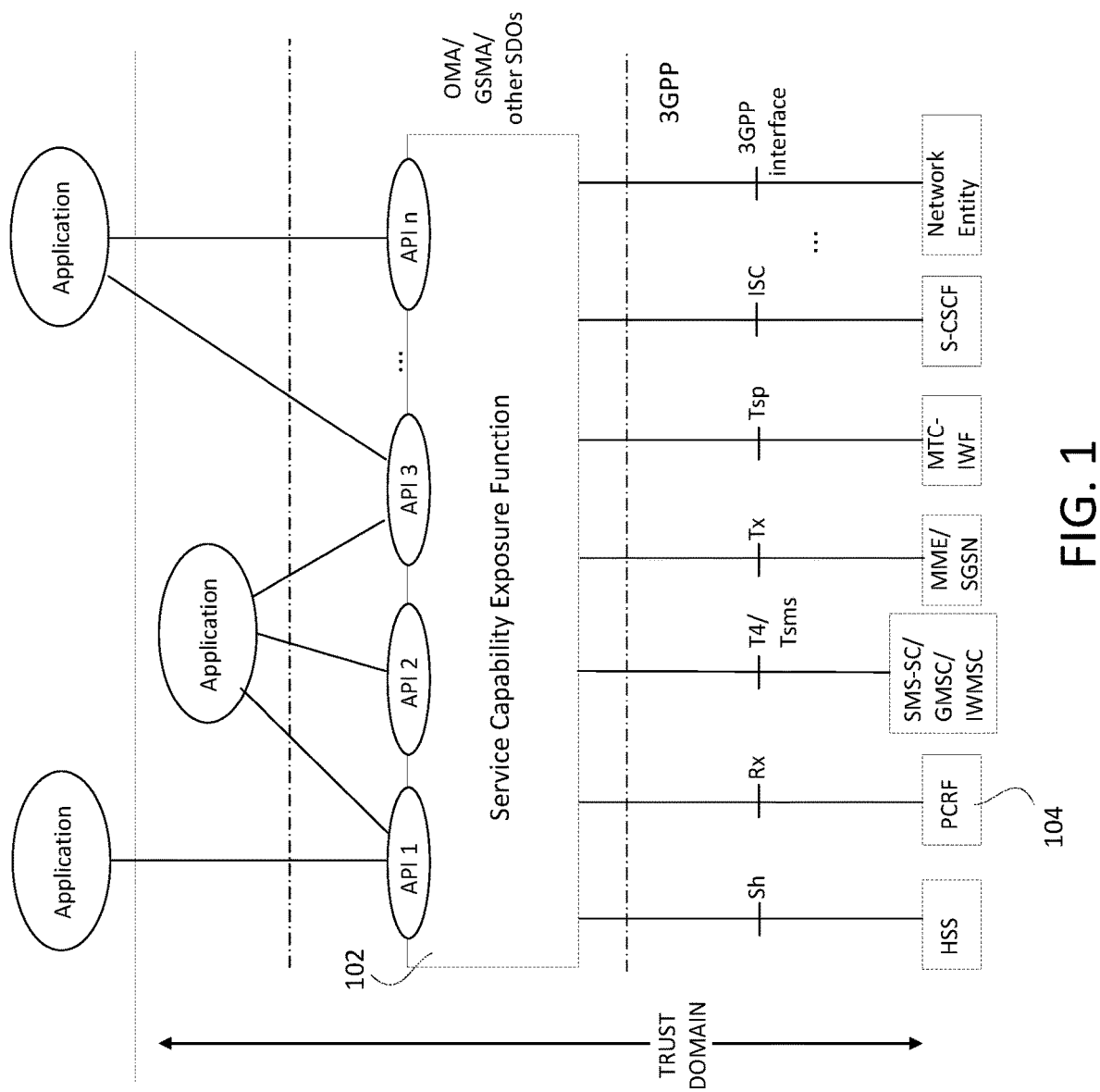
FIG. 1 is a diagram of a Service Capability Exposure Function Architecture.
Figure 2:
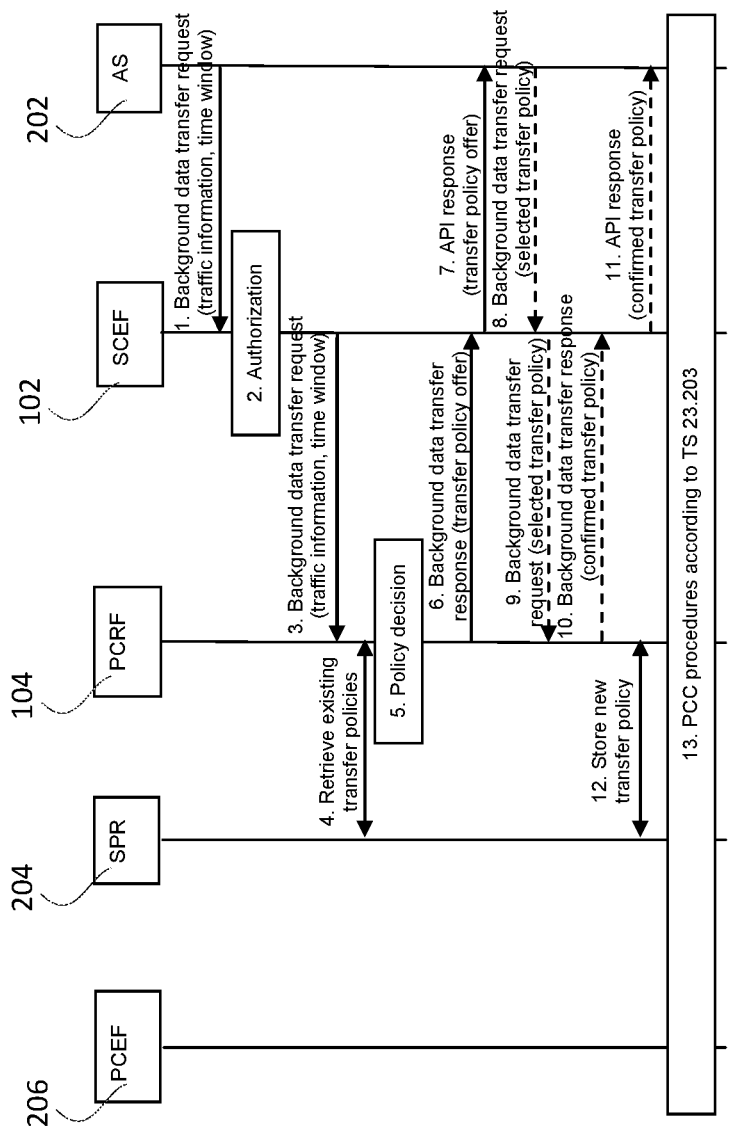
FIG. 2 is a diagram of a general approach for resource management for background data transfer.
Figure 3:
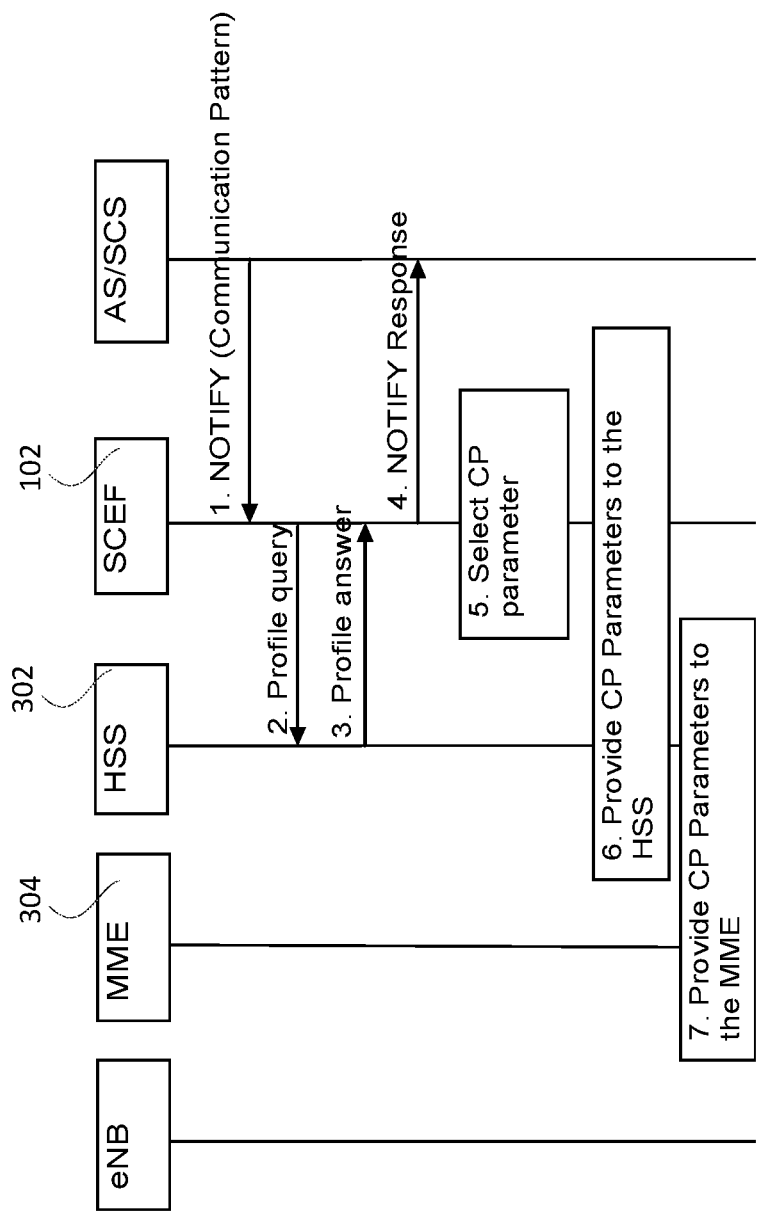
FIG. 3 is a diagram of a signaling sequence for provisioning of CP Parameters.
Figure 4:
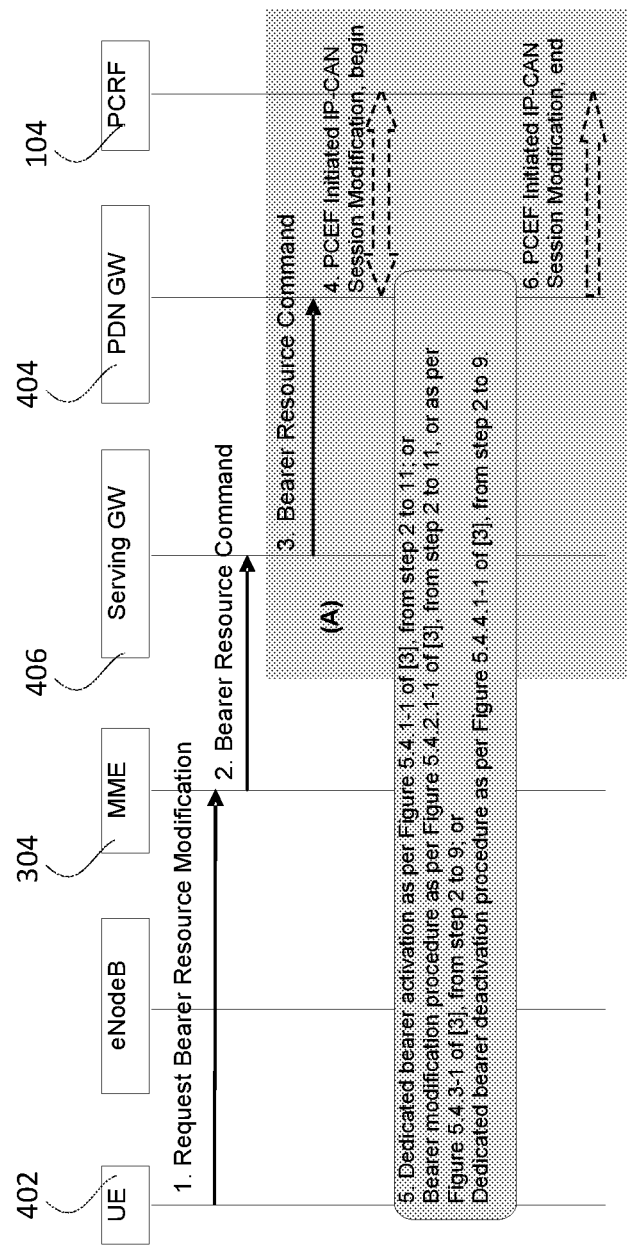
FIG. 4 is a diagram of a UE requested bearer resource modification.
Figure 5:
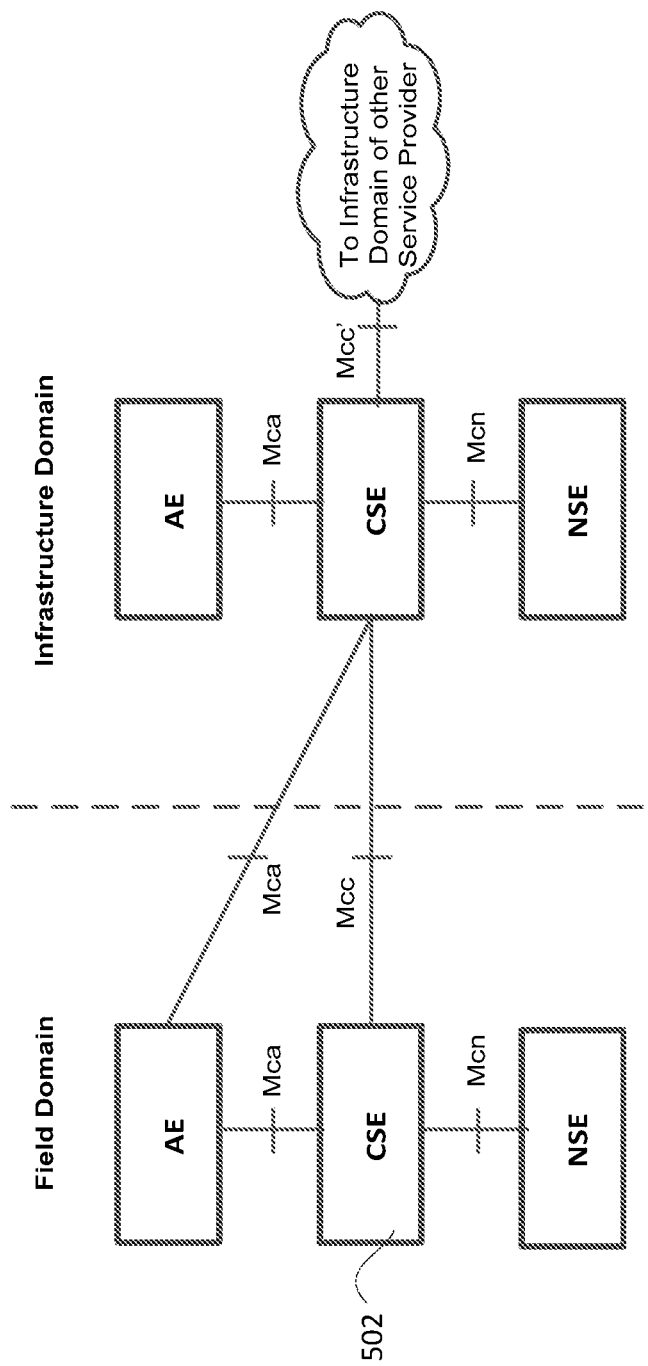
FIG. 5 is a diagram of a oneM2M Functional Architecture.
Figure 6:
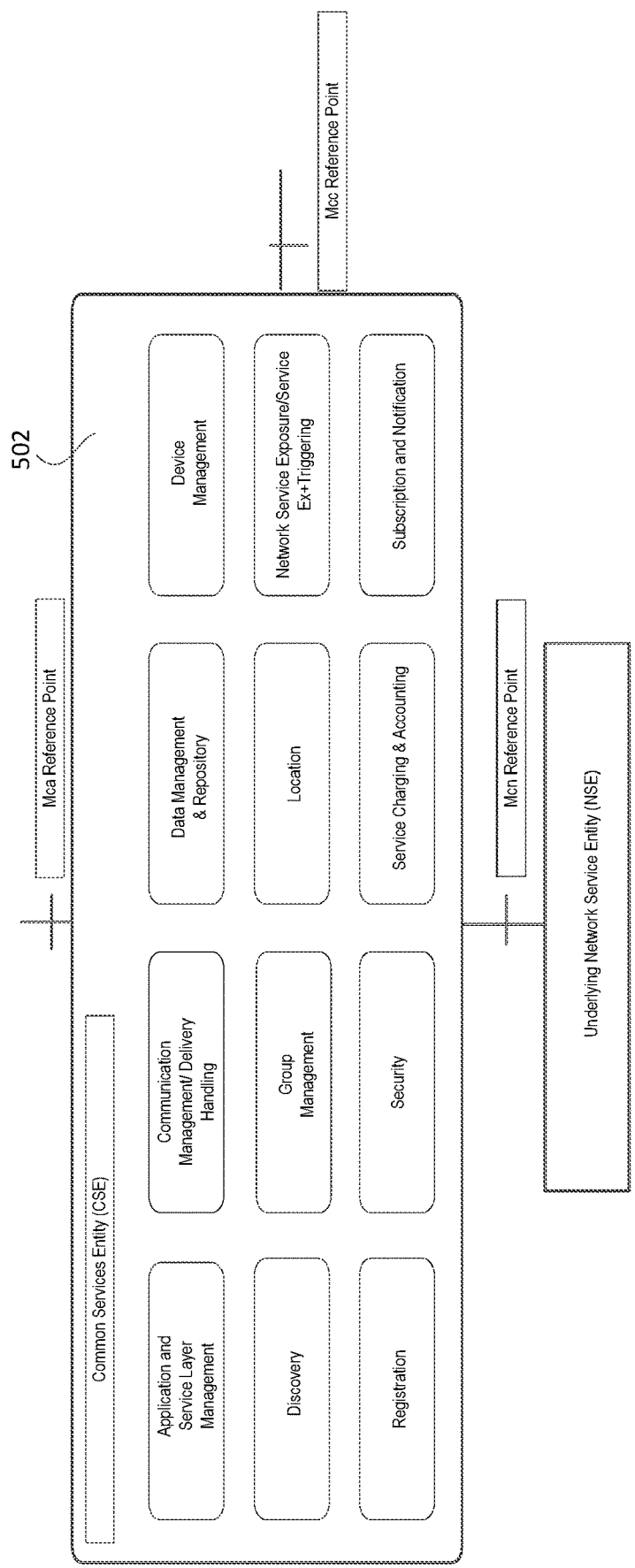
FIG. 6 is a diagram of a ROA representation of the Common Services Functions within a CSE in oneM2M.
Figure 7:
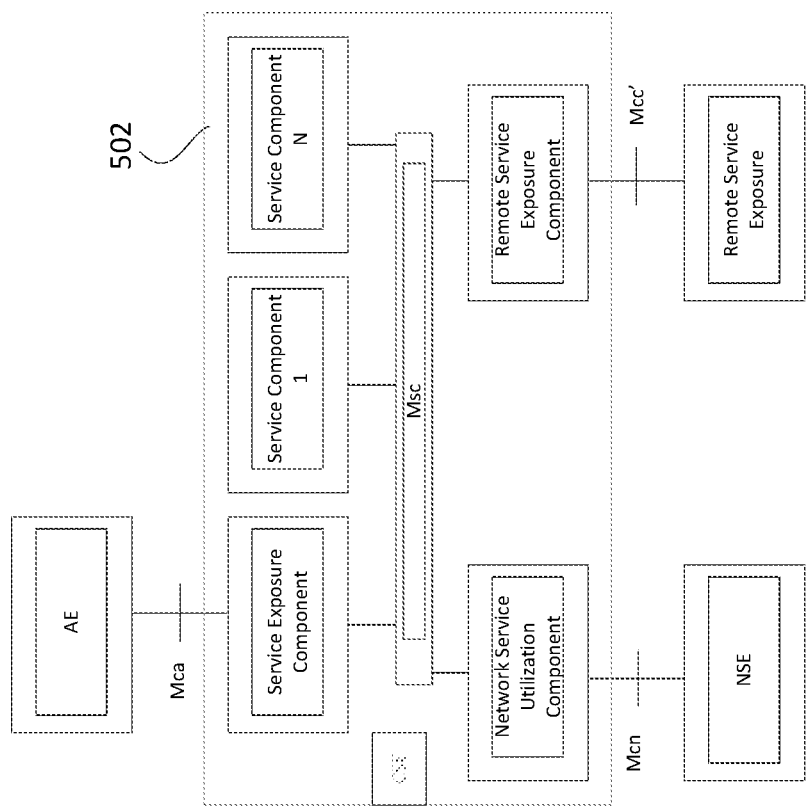
FIG. 7 is a diagram of a SOA representation of a CSE in oneM2M.
Figure 8:
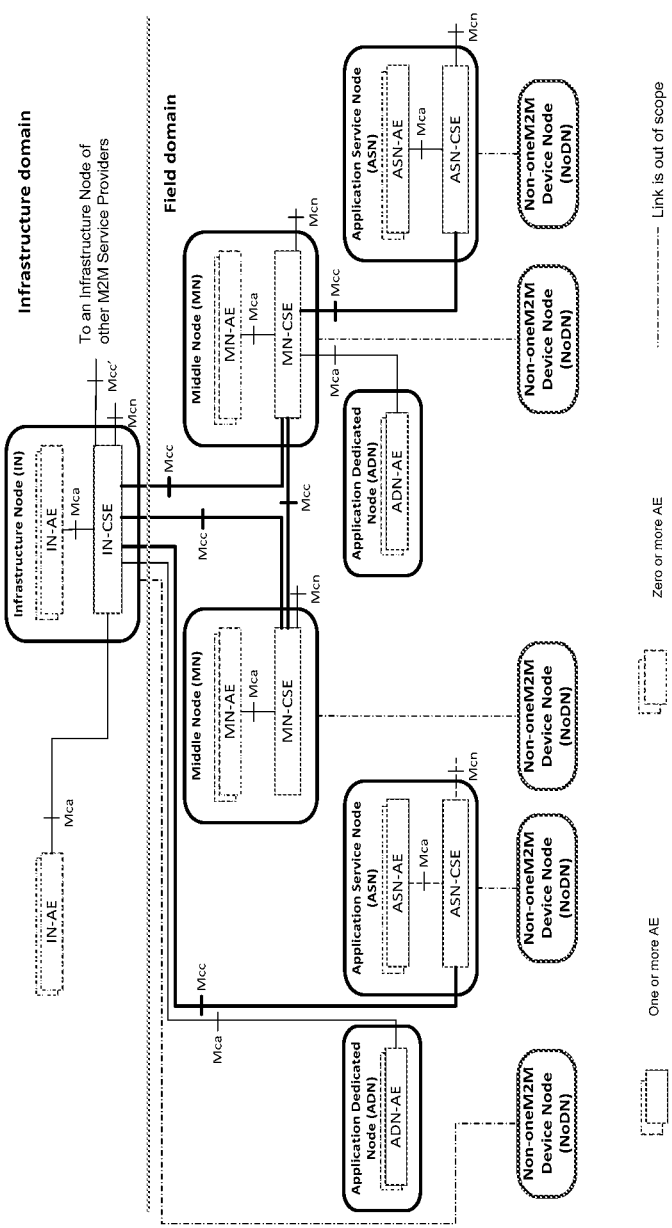
FIG. 8 is a diagram of a configurations supported by the oneM2M architecture.
Figure 9:
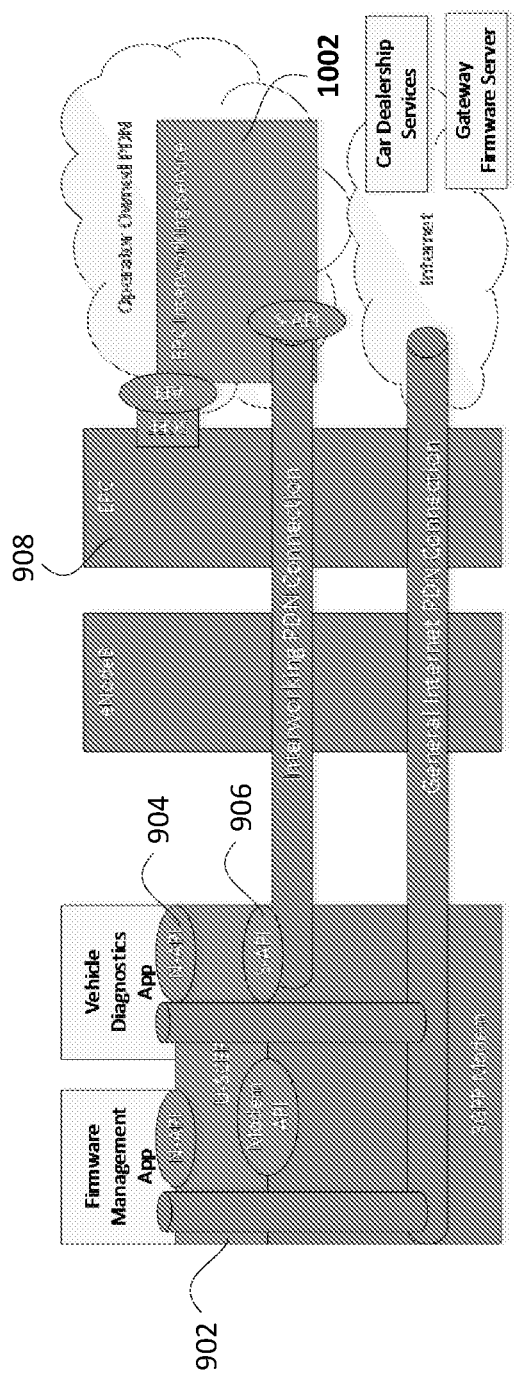
FIG. 9 is a diagram of a UE Application Interworking Architecture.

FIG. 9 shows the architecture to allow a UE 402 platform to interwork with the EPC 908. The yellow blocks represent applications that might have no business relationship with the MNO. The orange blocks are the focus of this disclosure and represent the logic that is necessary to allow the device applications to interwork with the EPC 908.

A UE Service Capability Exposure Function (U-SCEF) 1002 can be added to the UE platform. The UE platform can include 3GPP Modem (L1, L2, and L3), Operating System, and Applications.

The U-SCEF 902 may be part of the UE's OS. Alternatively, it may be an Application or a service that runs on top of the UE's OS. For example, it may be an oneM2M AE or an oneM2M CSF.

The U-SCEF 902 may expose a Northbound API (N-API) to UE 402 applications. Examples of UE applications are Firmware Management Applications, Multimedia Applications, Vehicle Diagnostics Applications, Applications that collect sensor measurements, Applications that track the status of packages or inventory, Service Layers (i.e. oneM2M ASN-CSE or MN-SCE), etc.

The U-SCEF 902 can use a PDN connection to connect to an EPC Interworking Service. It is expected that the EPC Interworking Service is owned by the MNO and in the trust domain. The EPC Interworking Service may be an oneM2M Common Service Entity (CSE), a service within a CSE 502, or an Application.

The U-SCEF 902 and EPC Interworking Service 1002 can communicate via an S-API 906.

The EPC Interworking Service 1002 obtains UE information from the S-API 906 and passes it to the EPC 908 via the SCEF 102.

The U-SCEF 902 may also have access to an API that it allows it to configure the UE's modem. For example, the U-SCEF 902 may configure the Modem's mobility management timers based on input from the Applications.

The U-SCEF 902 is a logical function that runs on the 3GPP UE 402. It may be part of the modem OS or middleware that sits between the UE Applications and OS.

At start up, the U-SCEF 902 may use the UE's default PDN Connection to communicate. Alternatively, the user may enter a U-SCEF Access Point Name (APN) via a user interface such as a GUI, an API command, an Attention (AT) command, or storing the U-SCEF APN in the UE's Subscriber Identity Module (SIM) card. The U-SCEF APN may be used by the U-SCEF 902 to establish a network connection. The U-SCEF APN may serve as an indication to the EPC that the purpose of the PDN Connection is to contact the EPC Interworking Service 1002. When the PDN connection is established, the MME 304 may check that the UE's subscription information indicates that the UE 402 is authorized to connect to this U-SCEF APN. Using a special APN for the U-SCEF's connection and authorizing it via the UE subscription information provides a convenient method for the EPC to prevent unauthorized UE's from accessing the EPC interworking service.

The UE's subscription information in the HSS 302 may indicate that it is allowed to run a U-SCEF 902. The indication may be that the UE 402 is allowed to access a special APN that is used by U-SCEF's to access the EPC Interworking Service.

The U-SCEF 902 may expose an N-API (Northbound API) 904 to applications that are hosted on the UE 402. This API will be exposed to applications that run on the UE 402. For example, it would be used by Firmware Management Applications, Multimedia Applications, Vehicle Diagnostics Applications, Applications that collect sensor measurements, Applications that track the status of packages or inventory, Service Layers (i.e. oneM2M ASN-CSE or MN-SCE), etc. Exemplary N-APIs are described with respect to tables 3-7.

The Application Registration API is called by an Application to indicate to the U-SCEF 902 that the application will be using the U-SCEF 902. This API can be triggered at UE 402 start up, by another application, or by a GUI. The Application will provide its Application Identifier to the U-SCEF 902 and the U-SCEF 902 will respond by indicating what capabilities of the U-SCEF 902 the application is permitted to access.

The Application identifier is a UE local application identifier that was assigned by the OS.

The capabilities response may indicate that the application is not permitted to use any of the capabilities (i.e. scheduling, setting the battery level, etc.) of the U-SCEF 902 or simply a sub-set of the UE's capabilities. The UE 402 may provide a user interface, such as a GUI, API commands, or AT commands that can be used to configure the U-SCEF 902 or UE 402 so that it knows what applications are permitted to access the U-SCEF 902.

TABLE 3

N-API, Application Registration

| Element | Direction | Type | Description |
| --- | --- | --- | --- |
| Application ID | In | Application Identifier | Assigned by the OS and local to the UE 402. |
| Permitted Capabilities | Out | Data Structure | A data structure that indicates the capabilities of the U-SCEF 902 that the Application is permitted to access. For example, this setting can be used to indicate if the Application is permitted to change the UE's mobility settings, communication schedule, etc. |

The Application Battery Level Indication API can be used by an application, OS, or battery driver to indicate the battery level to the U-SCEF 902.

The U-SCEF 902 may forward this information to the EPC Interworking Service so that the EPC Interworking Service can consider the battery level when configuring the UE's communication schedule, Discontinuous Reception (DRX) cycle, Power Savings Mode (PSM) cycle, Mobility Management Timers, etc. Alternatively, the UE 402 can use this indication to adjust how often it performs cell selection/re-selection.

The U-SCEF 902 may use this information to determine what communication schedule, DRX cycle, PSM cycle, etc. to request from the network.

TABLE 4

N-API, Application Battery Level Indication

| Element | Direction | Type | Description |
| --- | --- | --- | --- |
| Application ID | In | Application to the Identifier | Assigned by the OS and local UE 402. |
| Battery Level | In | Integer | Battery Level expressed as a percentage or alternatively a string that indicates high, medium, low. |

The Application One Time Communication Schedule Request API is used by an Application to request that the U-SCEF 902 indicate when the Application can begin the data exchange that is described in the API input.

This API could be used by an application that is hosted on a vehicular gateway UE 402. The application may like to download a firmware upgrade from the network. In one example, the application would like to ask the U-SCEF 902 when would be the best time to download the firmware image.

In one embodiment, the API can result in non-blocking behavior. The Application may provide a pointer to a return function that may be called when requested communication may commence.

In an alternate embodiment, the API call can result in blocking behavior. The API may return a start time to the application. The Application would be responsible for starting the data exchange at the indicated start time.

Figure 10:
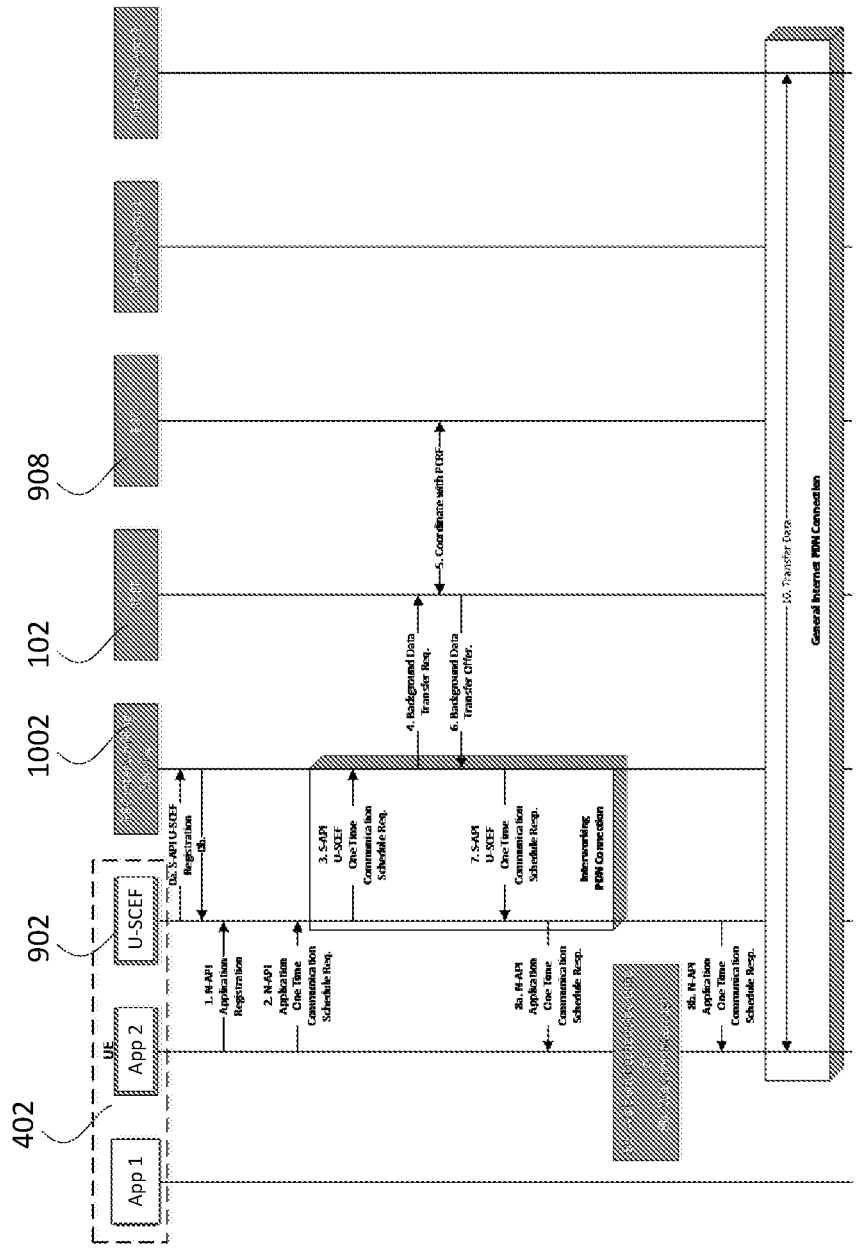
FIG. 10 is a diagram of a scheduled communication use case.

When this API is called, the U-SCEF 902 may independently decide the best time for the data exchange, or it may use the U-SCEF One Time Communication Schedule Request S-API request that the EPC Interworking Service provide the optimal communication time. A call flow that demonstrates how this API may be used by an application is shown in FIG. 10.

In one embodiment, the API call may be modeled in a non-blocking fashion. The Application may provide a pointer to a return function that may be called when requested communication period may commence.

In another embodiment, the API call may be modeled in a blocking fashion. The API may return a start time to the application. The Application would be responsible for starting the data exchange at the indicated start time.

Figure 11:
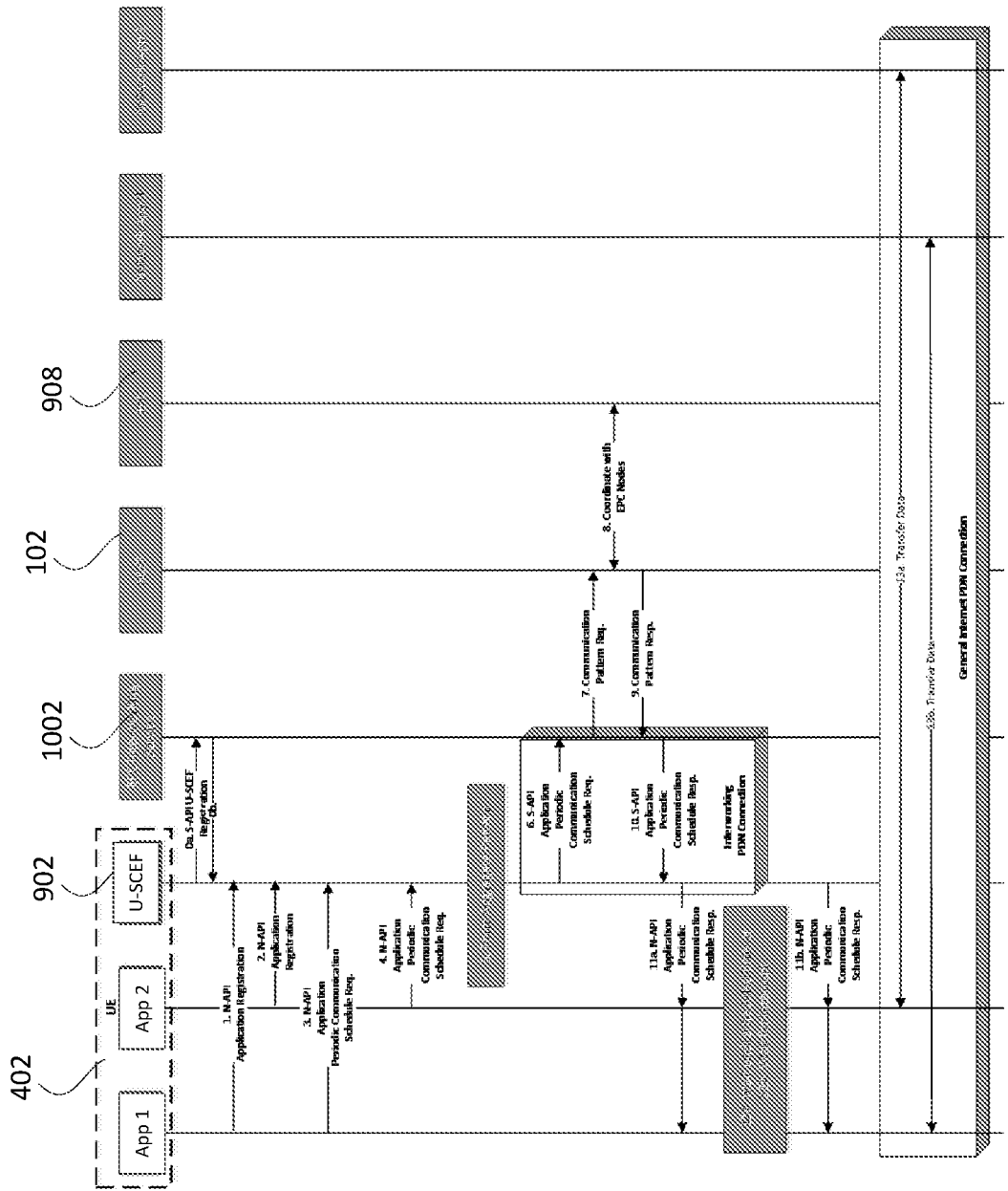
FIG. 11 is a diagram of a periodic communication use case.

When this API is called, the U-SCEF 902 may independently decide the best time for the data exchange, or it may use the U-SCEF Periodic Communication Request S-API request and have the EPC Interworking Service provide the optimal communication time. A call flow that demonstrates how this API may be used by an application is shown in FIG. 11.

TABLE 5

N-API, Application One Time Communication Schedule Request

| Element | Direction | Type | Description |
| --- | --- | --- | --- |
| Application ID | In | Application Identifier | Assigned by the OS and local to the UE 402. |
| Download Size | In | Integer | Download Size Estimate in Bytes. The Application may know the download size based on information from the Server or it may anticipated based on provisioned information or previous downloads. |
| Upload Size | In | Integer | Upload Size Estimate in Bytes |
| Deadline | In | Time | The time by which the data exchange should be completed or expired. |
| Return Function | In | Pointer | A pointer to a return function that may be called when communication may start |
| Time Duration | In | Time | The time duration for the requested connection. |
| Bit Rates | In | Integer | The bit rate required for the connection |
| Latency | In | Time | The latency required for the connection |
| Start Time | Out | Time | The time when the data exchange may commence. |

The Application Periodic Time Communication Schedule Request API is used by an Application or GUI to request that the U-SCEF 902 indicate when the Application can begin a periodic data exchange that is described in the API input.

This API could be used by a sensing application that wishes to upload data once an hour. The API can be used to get an indication from the U-SCEF 902 when it is optimal to start the communication cycle. For example, it may be more optimal to upload the sensor data once an hour at 10 minutes after the hour than once an hour at 20 minutes after the hour.

Note that this API is particularly useful when there is more than one application running on the UE 402 that desires to communicate in a periodic fashion. The U-SCEF 902 may synchronize the applications so that their communication periods are aligned. By aligning their communication periods, the UE 402 may sleep for longer periods (i.e. stay in DRX or PSM for longer periods). Aligning communication patterns may mean that both applications are told to start at the same time or right after each other.

TABLE 6

N-API, Application Periodic Communication Schedule Request

| Element | Direction | Type | Description |
| --- | --- | --- | --- |
| Application ID | In | Application Identifier | Assigned by the OS and local to the UE 402. |
| Communication Duration | In | Integer | The expected amount of time that the Application needs to communicate. |
| Period Time | In | Integer | How often the Application expects to need to communicate |
| Download Size | In | Integer | Download Size Estimate in Bytes |
| Upload Size | In | Integer | Upload Size Estimate in Bytes |
| Return Function | In | Pointer | A pointer to a return function that may be called when communication may start |

TABLE 6-continued

N-API, Application Periodic Communication Schedule Request

| Element | Direction | Type | Description |
|---|---|---|---|
| Number of Periods | In | Integer | The number of communication periods before the session expired. The U-SCEF 902 may continue the periodic communication sessions by resending the Application Periodic Communication Schedule Request API. |
| Start Time | Out | Time | The time when the periodic data exchange may commence. |

The Application Mobility Indication API is used by an application or GUI to indicate the expected mobility level to the U-SCEF 902. The parameters in Table 7 can be used to indicate the expected mobility level.

The U-SCEF 902 may forward this information to the EPC Interworking Service so that the EPC Interworking Service can consider the expected mobility level when configuring the UE's mobility management timers, paging area, etc.

The U-SCEF 902 may use this information to determine how to set the UE's mobility management timers, PSM timers, DRX timers, etc. The U-SCEF 902 may use an API, AT Command to pass the mobility information or recommended timer values to the UE 402. Alternatively, the UE 402 can use this indication to adjust how often it performs cell selection/re-selection.

This API would be useful to an Application that runs on a vehicular gateway platform. The Application may indicate to the U-SCEF 902 that the vehicle is relatively stationary when the vehicle is parked, plugged into a charging station, stuck in traffic, etc. The UE 402 and the EPC may then more efficiently configure the UE's mobility management timers, PSM timers, DRX timers, paging area, etc.

This API would also be useful to a vending machine application. The Application may indicate to the U-SCEF 902 that it stationary whenever the vending machine is plugged in.

If multiple applications indicate different mobility levels to the U-SCEF 902 the U-SCEF 902 will aggregate the different indications and provide a single set of mobility indications to the EPC Interworking Service. The U-SCEF 902 may choose to use the indications that indicate the "highest" level of mobility and the indications that indicated mobility over the largest area, or use a super set of the indicated areas.

TABLE 7

N-API, Application Mobility Indication

| Element | Direction | Type | Description |
|---|---|---|---|
| Application ID | In | Application Identifier | Assigned by the OS and local to the UE 402. |
| Stationary Indication | In | Boolean | An indication of whether or not the UE 402 is mobile. |
| Stationary Location | In | Location | Expected GPS Location, Cell ID, etc. where the UE 402 can be found |
| Mobility Area | In | Location | Expected GPS Location, Cell ID's, etc. where the UE 402 is expected to roam |
| Average Mobility Speed | In | Speed | The average speed and direction of the UE 402. |

The U-SCEF 902 may use an S-API (Southbound API) to communicate with the EPC Interworking Service. The U-SCEF 902 may be used to send messages to the EPC Interworking Service via an IP based connection. Alternatively, the S-API may be used to send configuration information to the UE's Modem which will transmit the control information to a core network node. Exemplary S-APIs are discussed below with respect to tables 8-12.

After the UE 402 establishes a PDN connection to an APN that can be used to access the EPC Interworking Service, the UE 402 uses the U-SCEF Registration API to send an initial registration message to the EPC Interworking Service.

In one embodiment, only one U-SCEF 902 resides on a device. The U-SCEF 902 can identify itself with its 3GPP External Identifier. The U-SCEF 902 registration procedure is shown in uses cases below.

TABLE 8

S-API, U-SCEF 902 Registration

| Element | Direction | Type | Description |
|---|---|---|---|
| External ID | In | Device Identifier | 3GPP External ID (Device ID) |
| Permitted Capabilities | Out | Data Structure | A data structure that indicates the capabilities of the EPC Interworking Service that the U-SCEF 902 is permitted to access. |

The U-SCEF Battery Level Indication API can be used by a U-SCEF 902 to indicate the battery level to the EPC Interworking Service.

The EPC Interworking Service can consider the battery level when configuring the UE's communication schedule, DRX cycle, PSM cycle, Mobility Management Timers, etc.

The EPC Interworking Service can consider this information to determine what communication schedule, DRX cycle, PSM cycle, Mobility Management Timers, etc. to request from the network.

TABLE 9

S-API, U-SCEF Battery Level Indication

| Element | Direction | Type | Description |
| --- | --- | --- | --- |
| External ID | In | Device Identifier | 3GPP External ID (Device ID) |

TABLE 9-continued

S-API, U-SCEF Battery Level Indication

| Element | Direction | Type | Description |
| --- | --- | --- | --- |
| Battery Level | In | Integer | Battery Level expressed as a percentage. |

The U-SCEF One Time Communication Schedule Request API can be used by a U-SCEF 902 to request an indication of when a data transfer is permitted.

If multiple applications on the UE 402 request a onetime data transfer (i.e. via the Application One Time Communication Schedule Request API of 5.1.1.3), the U-SCEF 902 may consolidate the request into a single request to the EPC Interworking Service.

TABLE 10

S-API, U-SCEF One Time Communication Schedule Request

| Element | Direction | Type | Description |
| --- | --- | --- | --- |
| External ID | In | Device Identifier | 3GPP External ID (Device ID) |
| Download Size | In | Integer | Download Size Estimate in Bytes |
| Upload Size | In | Integer | Upload Size Estimate in Bytes |
| Deadline | In | Time | The time by which the data exchange should be completed. |
| SM Reference ID | Out | Integer | A Session Management Reference ID. The UE 402 may provide this reference ID to the network during a subsequent SM procedure. The network may use this reference ID to determine what policy or QoS is required for the UE's bearer. |
| Start Time | Out | Time | The time when the data exchange may commence. The start time can be considered a type of policy offer that tells the UE 402 it can perform the requested operation at the start time. |

The U-SCEF Periodic Time Communication Schedule Request API can be used by the U-SCEF 902 to request that the EPC Interworking Service indicate when the UE 402 can begin a periodic data exchange that is described in the API input.

If multiple applications on the UE 402 request a periodic data transfer (i.e. via the Application One Time Communication Schedule Request API), the U-SCEF 902 may consolidate the request into a single request to the EPC Interworking Service 1002. The U-SCEF 902 may synchronize the applications so that their communication periods are aligned. By aligning their communication periods, the UE 402 may sleep for longer periods (i.e. stay in DRX or PSM for longer periods). Aligning communication patterns may mean that both applications are told to start at the same time or right after each other.

TABLE 11

S-API, U-SCEF 902 Periodic Communication Schedule Request

| Element | Direction | Type | Description |
| --- | --- | --- | --- |
| External ID | In | Device Identifier | 3GPP External ID (Device ID) |
| Communication Duration | In | Integer | The expected amount of time that the Application needs to communicate. |
| Period Time | In | Integer | How often the Application expects to need to communciate |

TABLE 11-continued

S-API, U-SCEF 902 Periodic Communication Schedule Request

| Element | Direction | Type | Description |
| --- | --- | --- | --- |
| Download Size | In | Integer | Download Size Estimate in Bytes |
| Upload Size | In | Integer | Upload Size Estimate in Bytes |
| SM Reference ID | Out | Integer | A Session Management Reference ID. The UE 402 may provide this reference ID to the network during a subsequent SM procedure. The network may use this reference ID to determine what policy or QoS is required for the UE's bearer. |
| Start Time | Out | Time | The time when the periodic data exchange may commence. The start time can be considered a type of policy offer that tells the UE 402 it can perform the requested operation at the start time. |

The U-SCEF Mobility Indication API is used by the U-SCEF 902 to indicate the expected mobility level to the EPC Interworking Service 1002.

The U-SCEF 902 may forward this information to the EPC Interworking Service so that the EPC Interworking Service 1002 can consider the expected mobility level when configuring the UE's mobility management timers, paging area, etc.

TABLE 12

S-API, U-SCEF 902 Mobility Indication

| Element | Direction | Type | Description |
| --- | --- | --- | --- |
| Application ID | In | Application Identifier | Assigned by the OS and local to the UE 402. |
| Stationary Indication | In | Boolean | An indication of whether or not the UE 402 is mobile. |
| Stationary Location | In | Location | Expected GPS Location, Cell ID, etc. where the UE 402 can be found |
| Mobility Area | In | Location | Expected GPS Location, Cell ID's, etc. where the UE 402 is expected to roam |
| Average Mobility Speed | In | Speed | The average speed and direction of the UE 402. |
| MM Reference ID | Out | Integer | A Mobility Management Reference ID. The UE 402 may provide this reference ID to the network during a subsequent Mobility Management (MM) procedure. The network may use this reference ID to determine optimal MM timer values for the UE 402. |
| MM Timer Values | Out | Integer | The EPC Interworking Service may provide the U-SCEF 902 with MM timer values such as T3412 and T3442 |

The Modem API may be used by the U-SCEF 902 to configure the modem based on input from Applications or the EPC Interworking Service.

When a Bearer is established for periodic communication or a one-time scheduled download, the U-SCEF 902 may provide the Policy Reference number to the 3GPP Modem so that the 3GPP modem may provide the policy reference number to the network when modifying the bearer that will be used to communicate.

When the EPC Interworking Service 1002 provides the U-SCEF 902 with mobility management timers or a MM Reference number, the U-SCEF 902 may provide the timer values or the MM reference number to the 3GPP modem so that the modem can provide them to the network when performing a MM procedure such as a tracking area update.

As shown in FIG. 9, the U-SCEF 902 may use a PDN connection or Data Network Connection that is established to communicate with the EPC Interworking Service 1002 and access exposed services. The EPC Interworking Service may be a virtualized Network Function. The UE's operating system or SIM card may be provisioned with an APN or Data Network Name or Network Slice Name or Network Slice Type Name or Service Name or Service Descriptor that the U-SCEF 902 should use when establishing the PDN connection or Data Network Connection or Network Slice Connection. The UE's subscription information in the HSS 302 may indicate that the UE 402 is allowed to access this APN or Data Network or is allowed to access a service exposure service. When the UE 402 attaches, the Mobility Management Entity (MME) 304 can check the UE's subscription information to see if it is allowed to access the PDN and the EPC interworking Service. Thus, the existing PDN Connection procedure and APN information in the UE's subscription may be used to prevent unauthorized UE's from accessing the EPC interworking service 1002. In a 5G network, when the UE 402 attaches, a network function can check the UE's subscription information to see if the UE is allowed to access the Network Slice, allowed to access the Data Network, and allowed to access the Service Exposure function. The Network Function that performs this check may be a CNSF.

Alternative methods may be used to allow the UE 402 to access the EPC interworking service and prevent unauthorized UE's from accessing the EPC interworking service 1002.

In an alternative embodiment, the U-SCEF 902 or SIM card may be provisioned with an identifier, IP address, or FQDN of the EPC Interworking Service 1002 and the U-SCEF 902 may use its default PDN connection or some other PDN connection to access the PDN connection. The EPC interworking Service 1002 may be tasked with checking that the UE 402 is authorized to access the service.

In an alternative embodiment, the signaling and information exchange between the U-SCEF 902 and EPC Interworking Service 1002 may not occur over the user plane and thus would not require a PDN connection. Instead, the EPC Interworking Service 1002 may be an independent core network function or it may reside in a core network node such as the MME 304, SCEF 102, Machine Type Communication Interworking Function (MTC-IWF), or PCRF 104. The EPC Interworking Service 1002 may be implemented as a virtualized function. The U-SCEF 902 may communicate with the EPC Interworking Service 1002 via control plane signaling such as NAS messaging.

The EPC Interworking Service 1002 serves as the "coordinator" between the UE 402 (U-SCEF) and the Core Network (SCEF). The EPC Interworking Service 1002 accepts coordination requests from the UE 402, negotiates with the Core Network, and provides the UE 402 with feedback so that the UE 402 can more optimally schedule its communication. Note that the EPC Interworking Service 1002 may be part of the SCEF 102. In other words, the U-SCEF 902 and SCEF 102 may communicate directly.

It is understood that the functionality illustrated in FIG. 9, may be implemented in the form of software (i.e., computer-executable instructions) stored in a memory of, and executing on a processor of, a node of an M2M network (e.g., a server, gateway, device, or other computer system), such as one of those illustrated in FIG. 14C or 14D described below.

The following describes some use cases. The Scheduled Download/Upload procedure, as shown in FIG. 10, is used by the UE 402 to schedule data transfer with the network. This procedure is particularly useful under the following circumstances.

Suppose the UE 402 wishes to download a firmware image in the next 24 hours. This procedure can be used by the UE 402 to tell the network that it needs to perform the download and allow the network to tell the UE 402 when to perform the download. The network can tell the UE 402 to download the image at a time when it expects traffic volume to be relatively low.

Suppose the UE 402 recent logged a large volume of sensor data, images, or video, and it wishes to upload the information to a server. This procedure can be used by the UE 402 to tell the network that it needs to perform the upload and allow the network to tell the UE 402 when to perform the upload. The network can tell the UE 402 to upload the image at a time when it expects traffic volume to be relatively low.

In step 0 of FIG. 10, the U-SCEF 902 establishes a connection with the EPC Interworking Service 1002. This may mean that the U-SCEF 902 establishes a special PDN connection or dedicated bearer to communicate with the EPC Interworking Service 1002. Once a connection is established, the U-SCEF 902 uses the U-SCEF Registration API to register with the EPC Interworking Service 1002. The EPC Interworking Service 1002 may respond with a list of features that are supported and that the U-SCEF 902 is permitted to access.

In step 1 of FIG. 10, application #2 uses the Application Registration N-API to register its identity with U-SCEF 902 and obtain a list of what features the U-SCEF 902 will allow the application to access.

In step 2 of FIG. 10, application #2 uses the Application One Time Communication Schedule N-API to indicate to the U-SCEF 902 that it would like to download 2 GB of data before 5 PM.

In step 3 of FIG. 10, the U-SCEF 902 uses its Interworking PDN Connection and the U-SCEF One Time Communication Schedule Req S-API to request a communication time from the EPC Interworking Service 1002.

The API call allows the UE 402 to identify itself with its External Identifier. When the EPC Interworking Service 1002 forwards the request to the SCEF 102 in step 4, the EPC Interworking Service 1002 may provide the External Identifier and the originating IP Address to the SCEF 102. The SCEF 102 may use the originating IP Address and External Identifier to verify (authenticate) the source UE 402. For example, the SCEF 102 may query the HSS 302, P-GW 404, PCRF 104, DHCP server, or DNS Server to verify that the IP address belongs to the UE 402 that is associated with the External Identifier.

In step 4 of FIG. 10, the EPC Interworking Service 1002 (Acting as an AS/SCS/AF/MTC Server/CSE) will forward the data transfer request to the SCEF 102.

In step 5 of FIG. 10, the SCEF 102 will request a data transfer time from the EPC using a procedure such as the one found in 2.3. As described in 2.3, the SCEF 102 will obtain a transfer policy offer that will include a time window for performing the transfer and a SM Reference ID that is associated with the transfer offer.

In step 6 of FIG. 10, the SCEF 102 will respond to the EPC Interworking Service 1002 with a data transfer offer. As described in Reference S2-151426, the SCEF 102 will obtain a transfer policy offer that will include a time window for performing the transfer and a SM Reference ID that is associated with the transfer offer.

In step 7 of FIG. 10, the EPC Interworking Service 1002 will forward the data transfer offer and the SM Reference ID to the U-SCEF 902.

In step 8a of FIG. 10, the U-SCEF 902 will forward the data transfer offer and the SM Reference ID to Application #2.

In step 8b of FIG. 10, the U-SCEF 902 will wait until the time that is indicated in the data transfer offer and send an indication to Application #2 that data transfer should start.

Once the U-SCEF 902 receives the data transfer offer, it may infer that the UE 402 will not need to communicate with the mobile network until the time that is indicated in the offer. Thus, it may choose to enter a sleep state until it is close to the data transfer time. Entering a sleep state may entail lowering clock frequencies, turning off memories or parts of memories, lowering the voltage to memories or parts of the modem, diming displays, etc.

In step 9a of FIG. 10, application #2 will receive the data transfer offer from the U-SCEF 902, wait until the indicated time, and then transfer the data.

In step 9b of FIG. 10, application #2 will wait until it receives an indication from the U-SCEF 902 and then begin the data transfer.

In step 10 of FIG. 10, application #2 will begin its data transfer with the Application Server. The data transfer will be on the UE's default PDN connection.

Prior to starting the data transfer with the Application Server, the UE 402 may send a Bearer Resource Activation Modification message to the MME 304 on the PDN connection that is used to transfer data to and from the Application Server (i.e. not the PDN connection that is used to communicate with the EPC Interworking Service 1002). The Bearer Resource Activation Modification Procedure is detailed in section 5.4.5 of reference 3GPP TS 23.401. The Bearer Resource Modification Request message is detailed in section 8.3.10 of reference 3GPP TS 24.301 ("Non-Access-Stratum (NAS) protocol for Evolved Packet System (EPS)"; Stage 3). A new Information Element can be added to this message so that the UE 402 can indicate the transfer policy Reference number to the network. The messages in the flow of section 5.4.5 of reference 3GPP TS 23.401 can be updated so that the MME 304 uses the Bearer Resource Command to pass the Transfer Policy Reference number to the S-GW 406 and the S-GW 406 will use the Bearer Resource Command to pass the Transfer Policy Reference number to the P-GW 404. The P-GW 404 passes the Transfer Policy Reference Number to the PCRF 104 and the Reference Number can be used to determine what PCC rules will be activated. The network (i.e. the PCEF 206) recognizes that the Reference Number is associated with a communication schedule request that will start at a known time. The network (i.e. PCRF 104) recognizes that QoS will not need to be provided until the prearranged time and the QoS will no longer need to be provided when communication is complete. The PCRF 104 may automatically terminate the bearer when communication is complete or a timer expires.

Alternatively, the data transfer and communication with the SCEF 102 can occur on the same PDN connection.

The Application Battery Level N-API and U-SCEF Battery Level S-API can be used to indicate the UE's battery level to the EPC Interworking Service 1002 prior to scheduling communication. The EPC Interworking Service 1002 and Core Network may take the battery level into account when deciding the optimal time for the UE 402 to communicate. For example, a low battery level may indicate that the UE 402 should be told to begin communicating soon.

This procedure, as shown in FIG. 11, is used by the UE 402 to schedule periodic communication with the network. Consider the following scenario.

The UE 402 hosts two applications. One application (App 1) is associated with a camera that captures a picture once every 5 seconds. The second application (App 2) is associated with a diagnostic sensor that uploads data once every 10 seconds. Each application will indicate to the U-SCEF 902 that they wish to perform periodic communication and the U-SCEF 902 will indicate to each Application when they should begin their periodic communication. Thus, the U-SCEF 902 can configure the application so that they simultaneously communicate with their respective server(s) or communicate at close to the same time. When both Applications are done communicating, the UE 402 can go into a power savings, or sleep state. By ensuring that the applications communicate at the same time, or close to the same time, the UE's transitions in and out of power savings, or sleep, mode are reduced.

The procedure in FIG. 11 shows how the U-SCEF 902 can coordinate the UE's periodic communication with the network. The procedure allows the network to configure the UE 402 with the optimal start time for its periodic communication. Thus, if many UE's wish to perform periodic communication, the network may configure the UE's such that the number of UE's that simultaneously communicate is reduced.

In summary, applications on the UE 402 are able to ask the U-SCEF 902 for their desired periodic communication schedule. The U-SCEF 902 is able to combine the desired schedule of all applications to form an aggregated schedule and ask the network for the optimal start time based on the aggregated communication schedule. The network is able to inform the U-SCEF 902 of the optimal start time and the U-SCEF 902 is able to configure the applications so that the UE 402 communicates at the optimal start time.

In step 0 of FIG. 11, the U-SCEF 902 establishes a connection with the EPC interworking Service. They may mean that the U-SCEF 902 establishes a special PDN connection or dedicated bearer to communicate with the EPC interworking service. Once a connection is established, the U-SCEF 902 uses the U-SCEF Registration API to register with the EPC Interworking Service 1002. The EPC Interworking Service 1002 may respond with a list of features that are supported and that the U-SCEF 902 is permitted to access.

In step 1 of FIG. 11, application #1 uses the Application Registration N-API to register its identity with U-SCEF 902 and obtain a list of what features the U-SCEF 902 will allow the application to access.

In step 2 of FIG. 11, application #2 uses the Application Registration N-API to register its identity with U-SCEF 902 and obtain a list of what features the U-SCEF 902 will allow the application to access.

In step 3 of FIG. 11, application #1 uses the Application Periodic Communication Schedule N-API to indicate to the U-SCEF 902 that it would like to upload 1 Kbyte of data every 5 seconds.

In step 4 of FIG. 11, application #2 uses the Application Periodic Communication Schedule N-API to indicate to the U-SCEF 902 that it would like to upload 3 Kbyte of data every 10 seconds.

In step 5 of FIG. 11, the U-SCEF 902 forms an aggregated communication schedule. The aggregate communication schedule indicates that the UE 402 wishes to upload 4 Kbytes of data every 5 seconds or, in another example, 5 Kbytes of data every 10 seconds.

In step 6 of FIG. 11, the U-SCEF 902 uses its Interworking PDN Connection and the U-SCEF Periodic Communication Schedule Req S-API to schedule periodic communication with the network.

In step 7 of FIG. 11, the EPC Interworking Service 1002 will act as an AS/SCS and provide the network with the periodic communication schedule.

In step 8 of FIG. 11, the SCEF 102 will configure the network with information about the communication pattern.

In step 9 of FIG. 11, the SCEF 102 will receive a response from the network acknowledging the periodic communication pattern. Note that this response may be enhanced to include an optimal start time for the periodic communication pattern. For example, it may indicate that communication should begin at 10 minutes after the hour. The response may also be updated to include a policy SM reference ID.

In step 10 of FIG. 11, the EPC Interworking Service 1002 will forward the periodic communication start time and the SM Reference ID to the U-SCEF 902.

In step 11a of FIG. 11, the U-SCEF 902 will forward the data transfer start time and the SM Reference ID to Applications 1 and 2.

In step 11b of FIG. 11, the U-SCEF 902 waits until the time that is indicated in the data transfer offer and sends an indication to Applications 1 and 2 that data transfer should start.

Once the U-SCEF 902 receives the data transfer offer, it may infer that the UE 402 will not need to communicate with the mobile network until the time that is indicated in the offer. Thus, it may choose to enter a sleep state until it is close to the data transfer time. Entering a sleep state may entail lowering clock frequencies, turning off memories or parts of memories, lowering the voltage to memories or parts of the modem, diming displays, etc.

In step 12a of FIG. 11, applications 1 and 2 will receive the data transfer offer from the U-SCEF 902, wait until the indicated time, and then transfer the data.

In step 12b of FIG. 11, applications 1 and 2 waits until they receive an indication from the U-SCEF 902 and then begin the data transfer.

In step 13 of FIG. 11, applications 1 and 2 begin their data transfer with the Application Server. The data transfer will be on the UE's default PDN connection.

Prior to starting the data transfer with the Application Server, the UE 402 may send a Bearer Resource Activation Modification message to the MME 304. The Bearer Resource Activation Modification Procedure is detailed in section 5.4.5 of reference 3GPP TS 23. The Bearer Resource Modification Request message is detailed in section 8.3.10 of reference 3GPP TS 24.301. A new Information Element can be added to this message so that the UE 402 can indicate the transfer policy Reference number to the network. The messages in the flow of section 5.4.5 of reference 3GPP TS 23.401 will be updated so that the MME 304 uses the Bearer Resource Command to pass the Transfer Policy Reference number to the S-GW 406 and the S-GW 406 will use the Bearer Resource Command to pass the Transfer Policy Reference number to the P-GW 404. The P-GW 404 passes the Transfer Policy Reference Number to the PCRF 104 and the Reference Number will be used to determine what PCC rules will be activated. The network (i.e. the PCEF 206) recognizes that the Reference Number is associated with a periodic communication schedule request that will start at a known intervals. The network (i.e. PCRF 104) recognizes that QoS will not need to be provided outside of the expected communication window. The PCRF 104 may terminate the bearer after a set number of commination cycles or after a pre-determined number of communication cycles are missed by the UE 402.

Alternatively, the data transfer and communication with the SCEF 102 can occur on the same PDN connection. The Application may change its periodic communication schedule by using the Application Periodic Communication Schedule N-API to pass the new periodic communication schedule to the EPC Interworking Service 1002.

Figure 12:
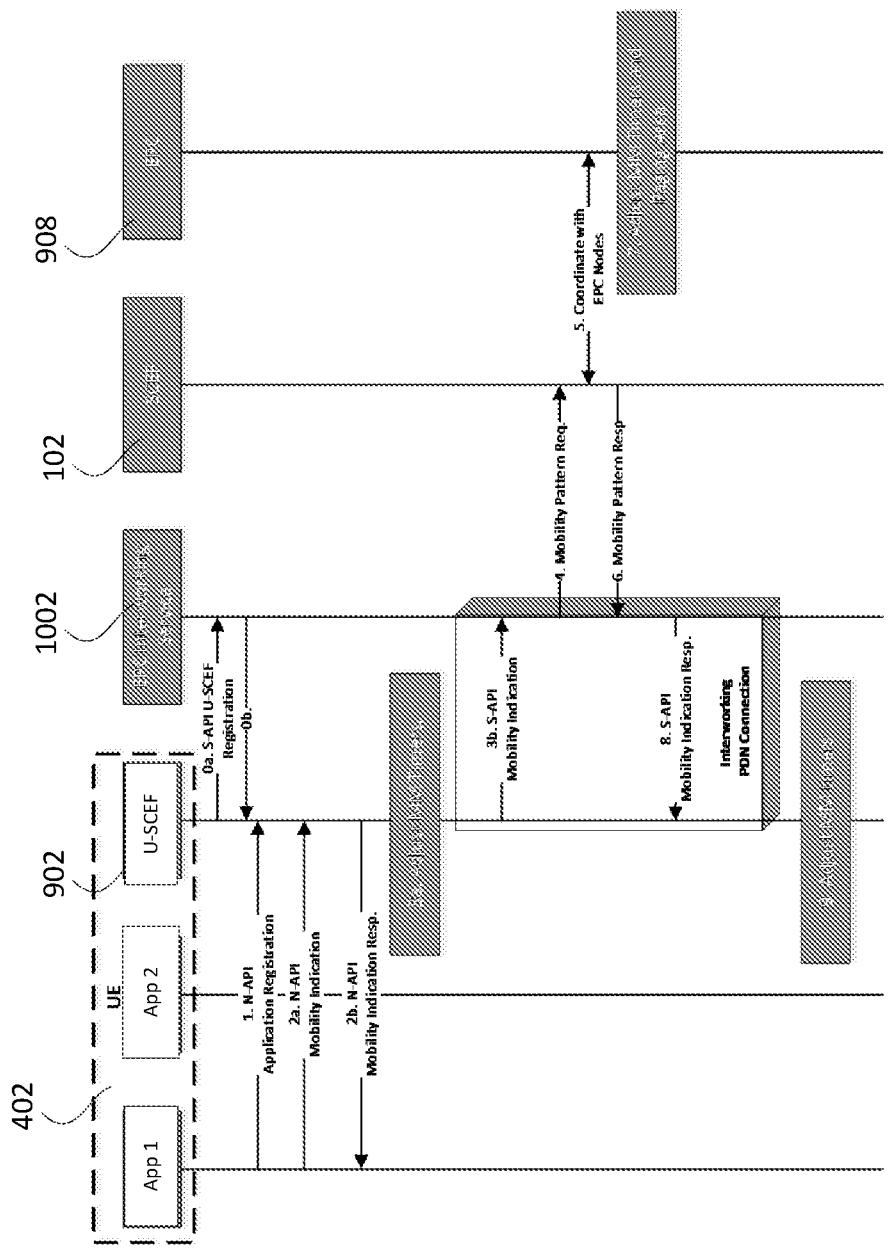
FIG. 12 is a diagram of a mobility indications use case.

The Mobility Indications procedure, as shown in FIG. 12, is used by Application(s) on the UE 402 to indicate their expected mobility to the U-SCEF 902. For example, an application that runs on a vehicular gateway may be aware of the UE's location, expected level of mobility, expected average speed, and whether or not the UE 402 is stationary. For example, the application may indicate that the UE 402 will be stationary if the car is parked or plugged into a charging station. The application may use GPS to detect that the UE 402 is on a highway and will likely be traveling at a high rate speed for some time.

The U-SCEF 902 may use this information to adjust the modem's mobility management timers. For example, the U-SCEF 902 may use this information to determine values for the T3412 and T3430 timers that are used to control the timing of Tracking Area Updates (TAU). These timers are defined in reference 3GPP TS 24.301.

The U-SCEF 902 may also pass the mobility information to the EPC interworking service 1002 so that the information can be used in the network, for example, to set mobility management timers.

In step 0 of FIG. 12, the U-SCEF 902 establishes a connection with the EPC interworking Service. They may mean that the U-SCEF 902 establishes a special PDN connection or dedicated bearer to communicate with the EPC interworking service 1002. Once a connection is established, the U-SCEF 902 will use the U-SCEF Registration API to register with the EPC Interworking Service 1002. The EPC Interworking Service 1002 may respond with a list of features that are supported and that the U-SCEF 902 is permitted to access.

In step 1 of FIG. 12, application #1 uses the Application Registration N-API to register its identity with U-SCEF 902 and obtain a list of what features the U-SCEF 902 will allow the application to access.

In step 2 of FIG. 12, application #1 uses the Application Mobility Indication N-API to indicate the expected mobility characteristics to the U-SCEF 902.

In step 3a of FIG. 12, the U-SCEF 902 configures the modems mobility management timers, for example, the U-SCEF 902 may use this information to adjust the T3412 and T3430 timers that are used to control the timing of Tracking Area Updates (TAU). These timers are defined in reference 3GPP TS 24.301. Alternatively, the UE 402 can use this indication to adjust how often it performs cell selection/re-selection.

In step 3b of FIG. 12, the U-SCEF 902 use the U-SCEF Mobility Indication N-API to pass the mobility indication information to the EPC Interworking Service 1002.

In step 4 of FIG. 12, the EPC Interworking Service 1002 will act as an AS/SCS and provide the network with the mobility indicators.

In step 5 of FIG. 12, the SCEF 102 will configure the network with information about the mobility indicators.

In step 6 of FIG. 12, the SCEF 102 will receive a response from the network acknowledging the mobility indicators. This response may be enhanced to include a mobility pattern reference ID. The MM Reference ID can be provided to the network at a later time (i.e. by the UE 402) and the network can set its mobility management timers accordingly. Alternatively, this response can be enhanced to provide mobility management timers such as T3412 and T3442.

In step 7 of FIG. 12, the network may adjust the UE's MM timers based on the mobility indicators.

In step 8 of FIG. 12, the EPC Interworking Service 1002 will respond to the U-SCEF Mobility Indication N-API. The response may include MM Timer values and a MM reference ID.

In step 9 of FIG. 12, the U-SCEF 902 may provide the new MM timer values and MM reference ID to the modem. The modem may adjust its MM timers the next time it performs a MM procedure such as a tracking area update. The modem may also provide the MM reference ID to the network when it performs a MM procedure such as a tracking area update. The MM reference ID may be used by the network (i.e. the MME 304) to determine the optimal MM timer values.

Later, the Application may change its mobility state by using the U-SCEF Mobility Indication N-API to pass the new mobility indication information to the EPC Interworking Service 1002.

Figure 14A:
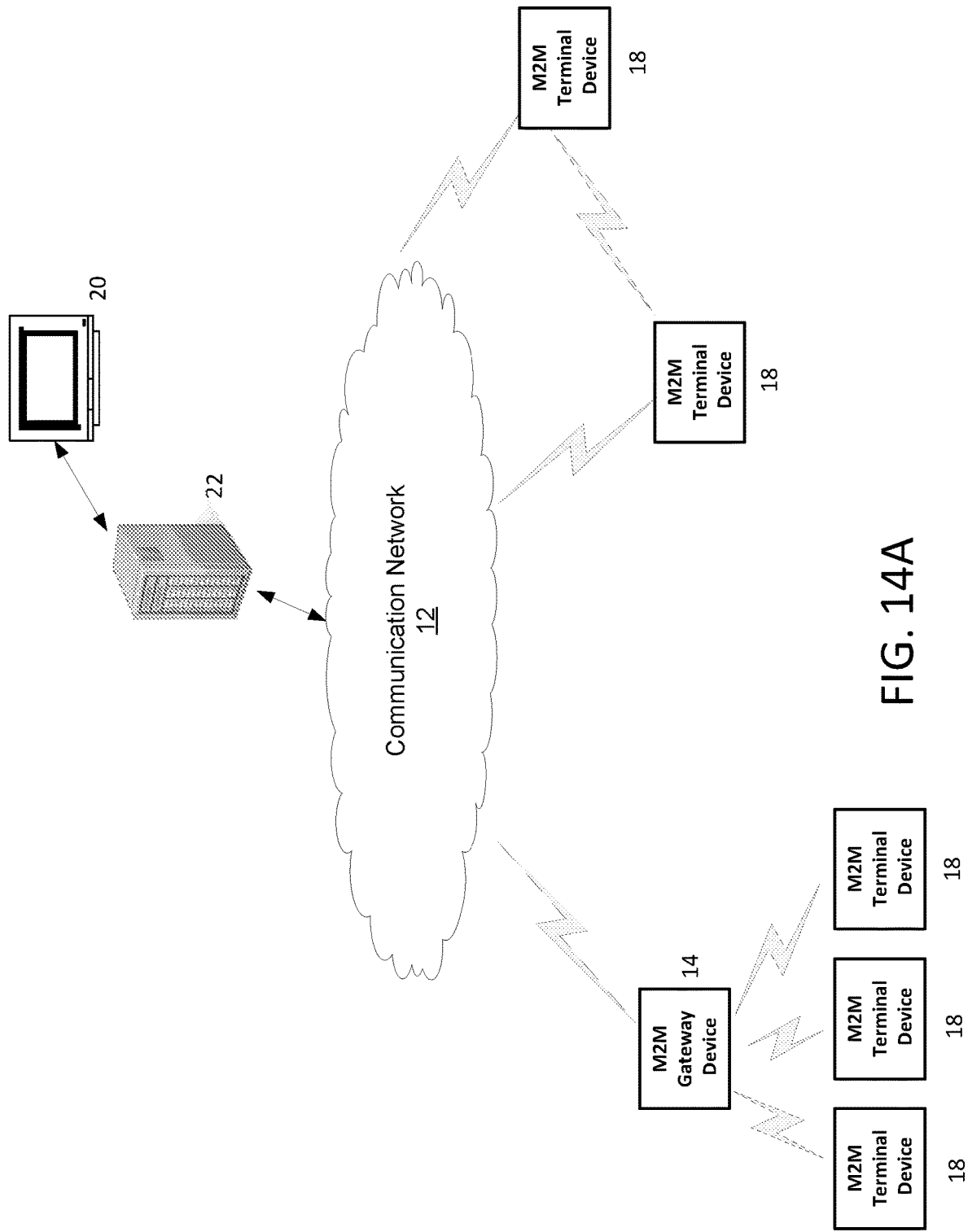
FIG. 14A is a diagram of a M2M/IoT/WoT communication system that includes a communication network.
Figure 14B:
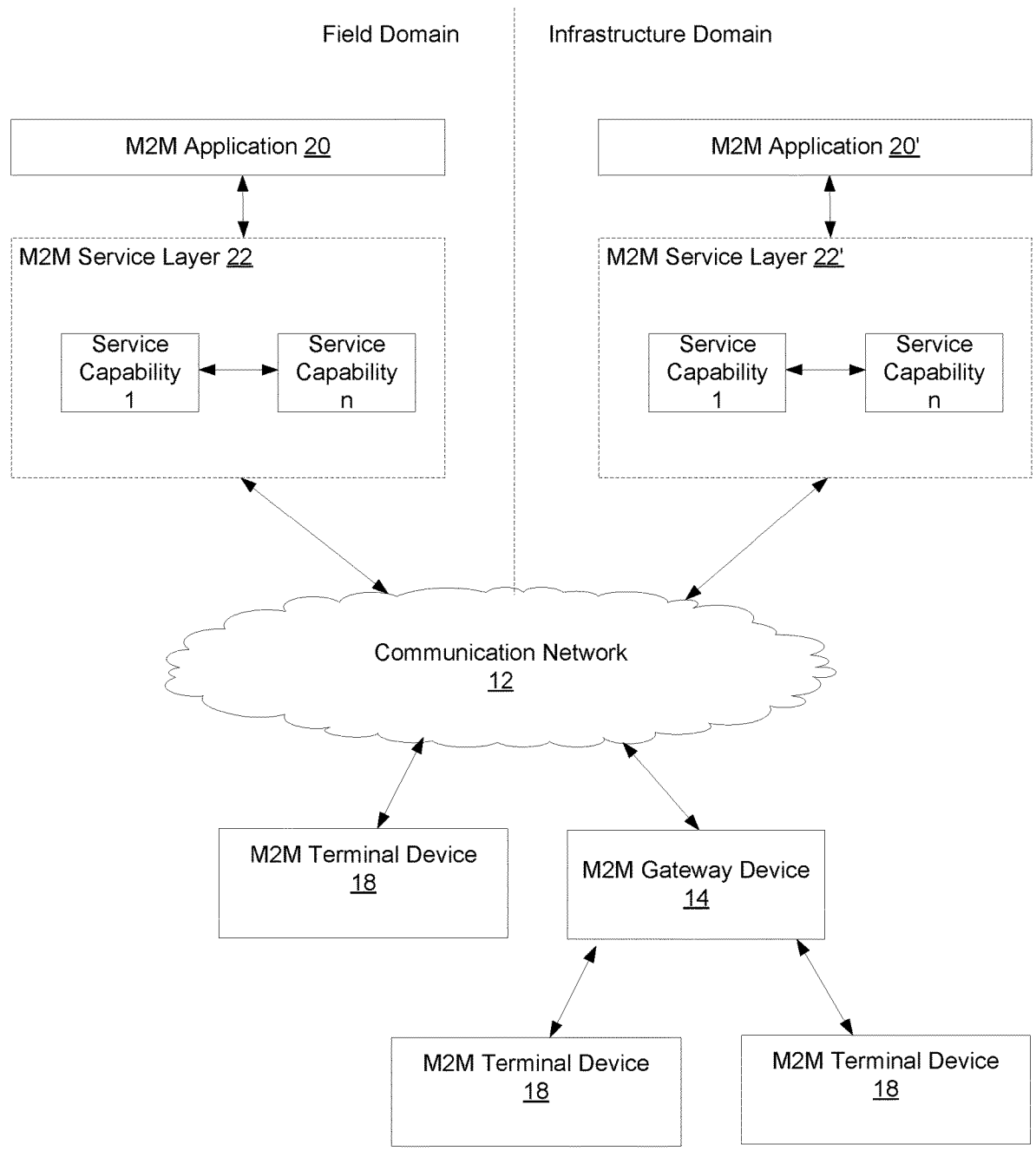
FIG. 14B is a diagram of an illustrated M2M service layer in the field domain that provides services for the M2M application, M2M gateway devices, and M2M terminal devices and the communication network.
Figure 14C:
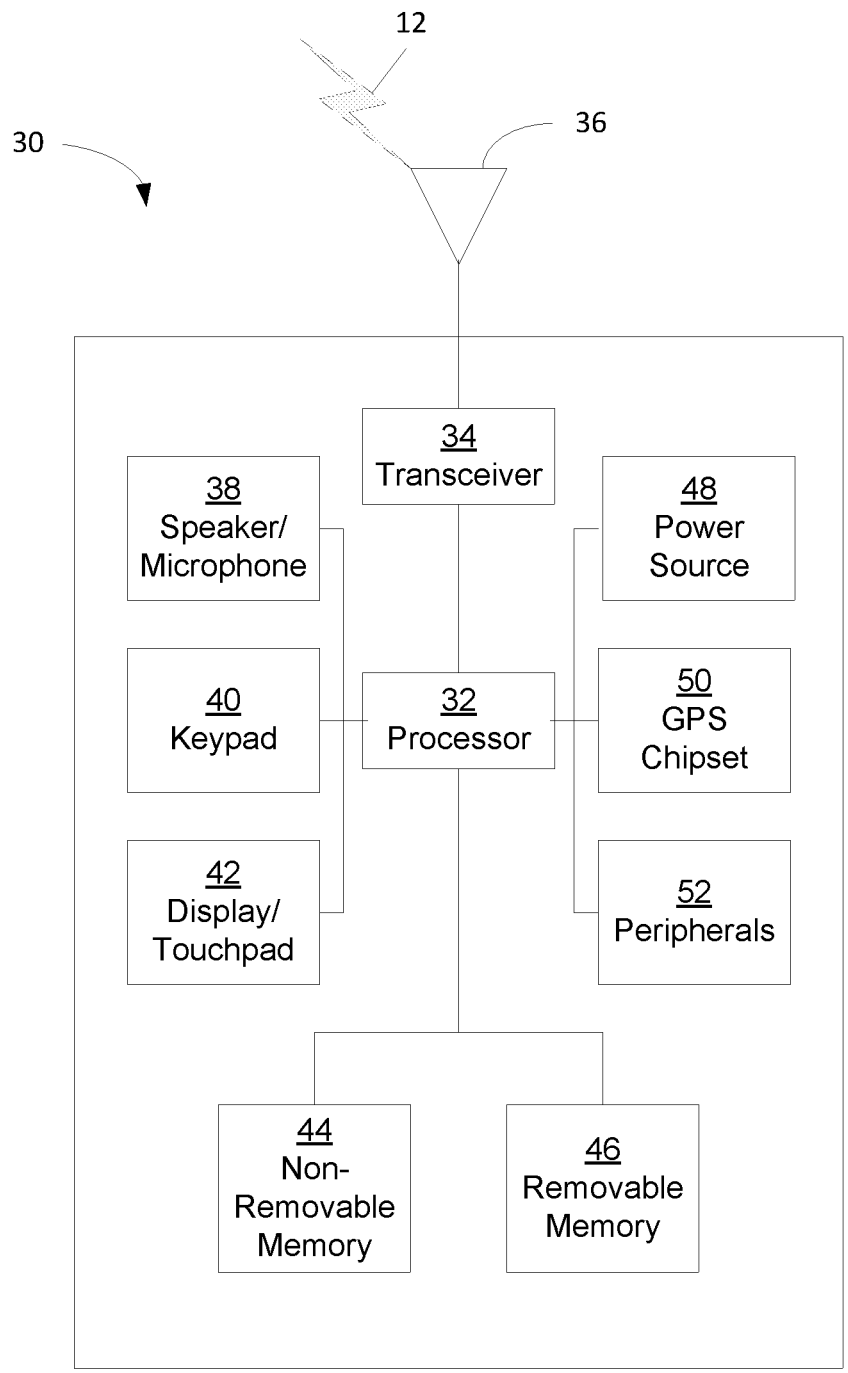
FIG. 14C is a diagram of an exemplary device that may be used to implement any of the network nodes described herein.
Figure 14D:
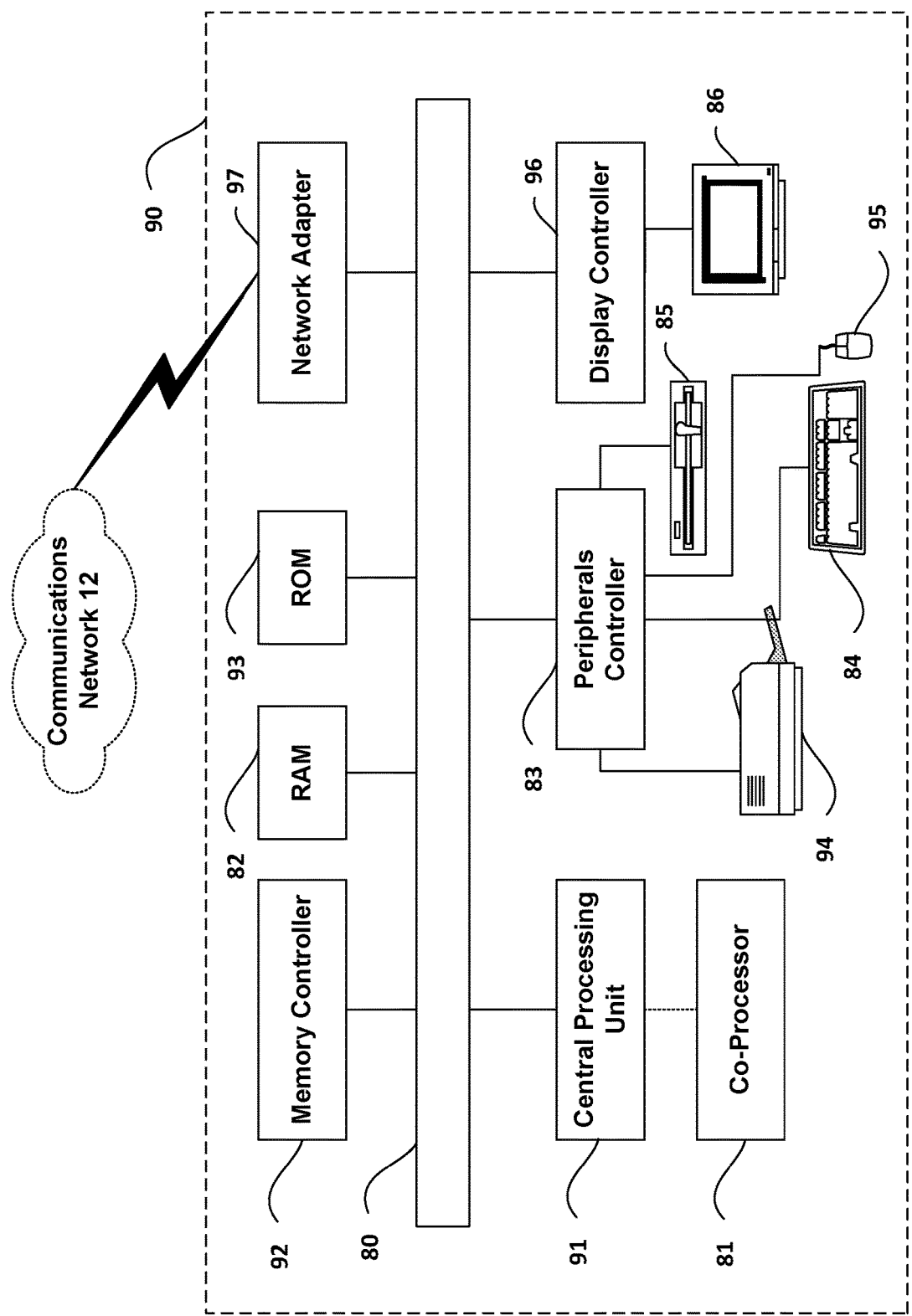
FIG. 14D is a block diagram of a computer system or server that may be used to implement any of the network nodes described herein.

It is understood that the entities performing the steps illustrated in FIGS. 10-12 are logical entities that may be implemented in the form of software (i.e., computer-executable instructions) stored in a memory of, and executing on a processor of, a network node or computer system such as those illustrated in FIG. 14C or FIG. 14D. That is, the method(s) illustrated in FIGS. 10-12 may be implemented in the form of software (i.e., computer-executable instructions) stored in a memory of a network node, such as the node or computer system illustrated in FIG. 14C or FIG. 14D, which computer executable instructions, when executed by a processor of the node, perform the steps illustrated in FIGS. 10-12. It is also understood that any transmitting and receiving steps illustrated in FIGS. 10-12 may be performed by communication circuitry of the node under control of the processor of the node and the computer-executable instructions (e.g., software) that it executes. It is understood that the entities in FIGS. 10-12 may be implemented in the form of Virtualized Network Functions.

Figure 13:
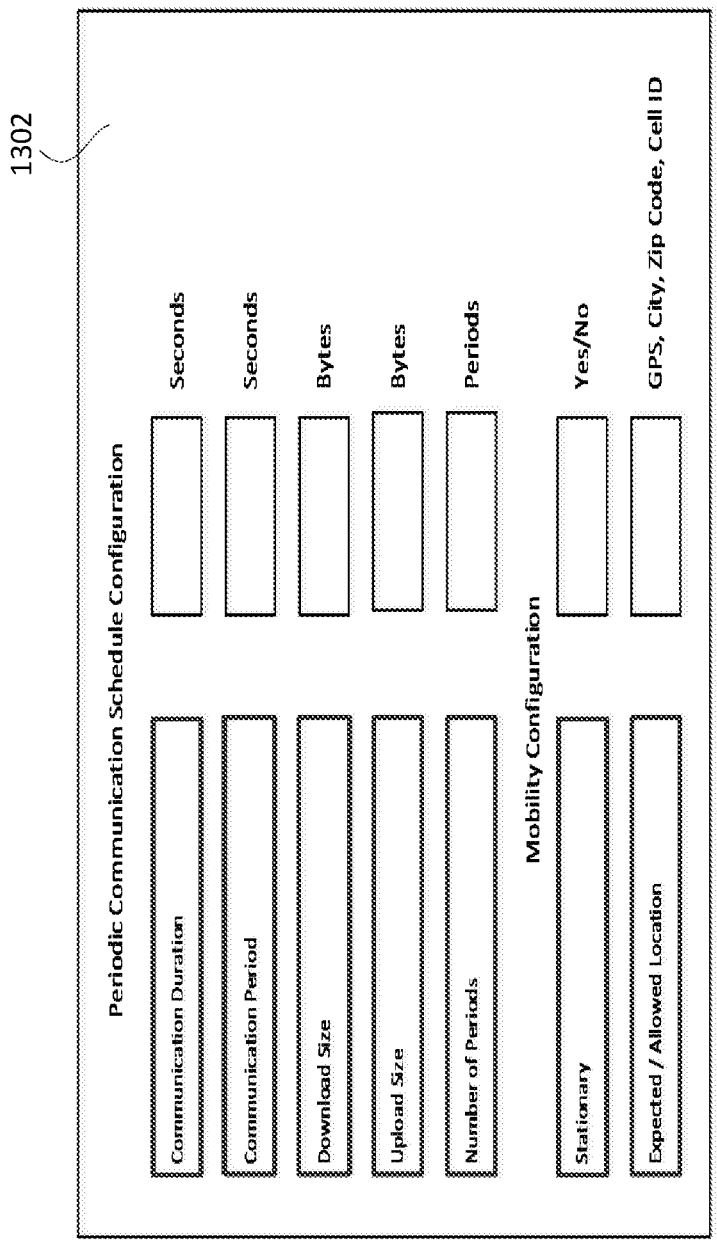
FIG. 13 is a diagram of a Graphical User Interface of one embodiment.

Interfaces, such as Graphical User Interfaces (GUIs), can be used to assist user to control and/or configure functionalities related to mobile core network and the UE 402 application interworking. FIG. 13 is a diagram that illustrates an interface 1302. A UE 402 may support the GUI 1302 that allows the user to configure the device to communicate with a certain schedule, indicate whether the device is mobile or stationary, etc. In other works, the application that communicates with the U-SCEF 902 via the N-API may be a GUI based application. The GUI may use the N-API that is described above to pass configuration information to the U-SCEF 902. It is to be understood that interface 1302 can be produced using displays such as those shown in FIGS. 14C-D described below.

Additional Background Material

Network Function Virtualization (NFV) aims to transform the way that network operators architect networks by evolving standard IT virtualization technology to consolidate many network equipment types onto industry standard high volume servers, switches and storage, which could be located in Data centers, Network Nodes and in the end user premises. It involves the implementation of network functions (e.g., mobility management, session management, QoS) in software that can run on a range of industry standard server hardware, and that can be moved to, or instantiated in, various locations in the network as required, without the need for installation of new equipment. NFV is applicable to any data plane packet processing and control plane function in mobile and fixed networks. Potential examples may include:

Switching elements: BNG, CG-NAT, routers.
Mobile network nodes: HLR/HSS, MME, SGSN, GGSN/PDN-GW, RNC, eNodeB.
Functions contained in home routers and set top boxes to create virtualized home environments.
Converged and network-wide functions: AAA servers, policy control and charging platforms.
Application-level optimization: CDNs, Cache Servers, Load Balancers, Application Accelerators.
Security functions: Firewalls, virus scanners, intrusion detection systems, spam protection.

Application of NFV brings many benefits to network operators, contributing to a dramatic change in the telecommunications industry landscape. NFV could bring the following benefits:

Reduced equipment costs and reduced power consumption through consolidating equipment and exploiting the economies of scale of the IT industry.
Increased velocity of Time to Market by minimizing the typical network operator cycle of innovation.
The possibility of running production, test and reference facilities on the same infrastructure provides much more efficient test and integration, reducing development costs and time to market.
Targeted service introduction based on geography or customer sets is possible. Services can be rapidly scaled up/down as required.
Enabling a wide variety of eco-systems and encouraging openness.
Optimizing network configuration and/or topology in near real time based on the actual traffic/mobility patterns and service demand.
Supporting multi-tenancy thereby allowing network operators to provide tailored services and connectivity for multiple users, applications or internal systems or other network operators, all co-existing on the same hardware with appropriate secure separation of administrative domains.
Reduced energy consumption by exploiting power management features in standard servers and storage, as well as workload consolidation and location optimization.

European Telecommunications Standards Institute (ETSI) has formed a specification group "Network Functions Virtualization" to publish some white papers, and to produce several more in-depth materials, including standard terminology definitions and use cases for NFV that act as references for vendors and operators considering implementing NFV.

ETSI GS NFV 002, Network Functions Virtualization (NFV); Architectural Framework is an ETSI publication that establishes an Architectural Framework for applying NFV concepts to the Mobile Core Network.

Figure 15:
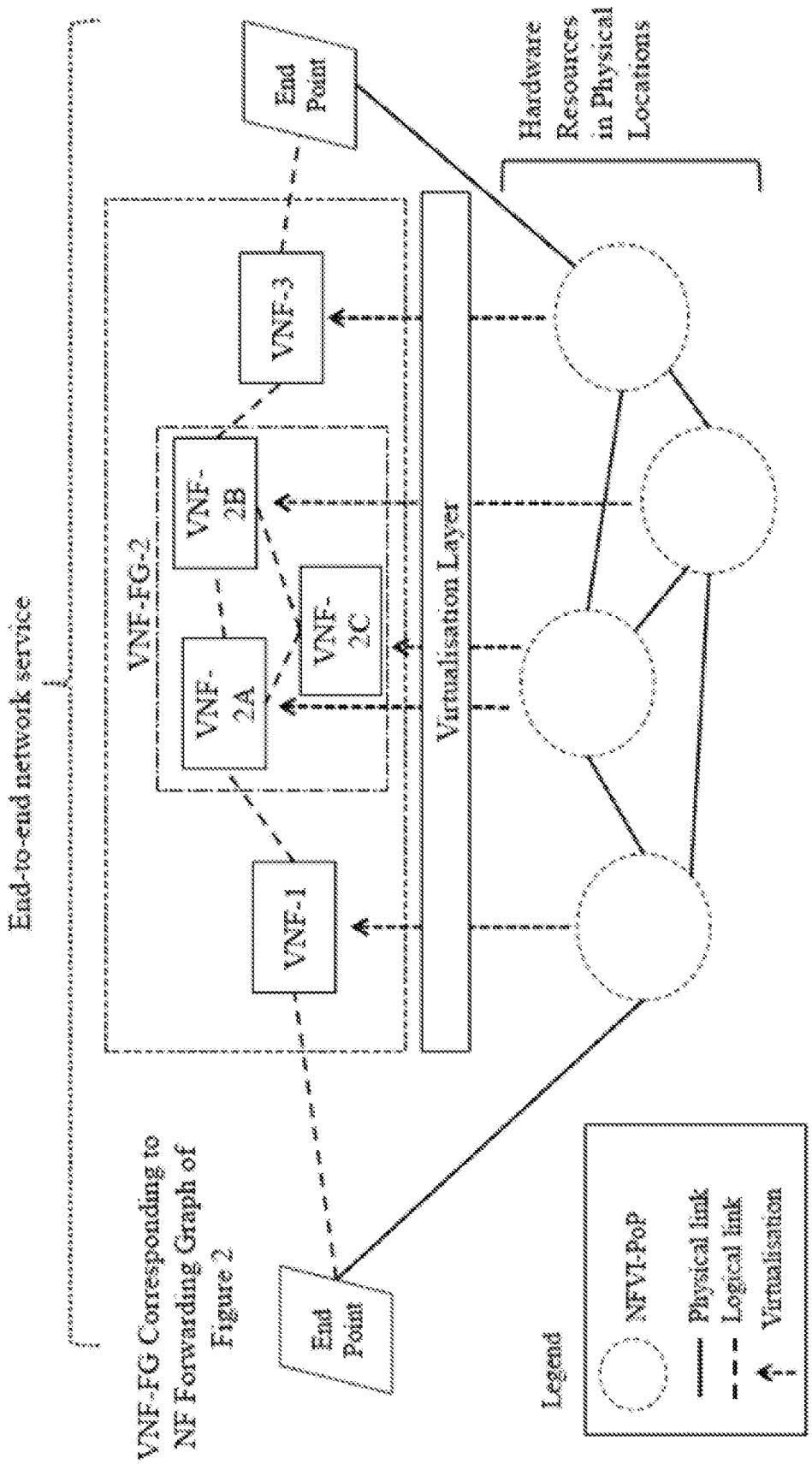
FIG. 15 is a diagram that illustrates the concept of a Virtualized Network Function Forwarding Graph (VNF-FG).

FIG. 15 is an exemplary end-to-end Network Service with VNFs and nested forwarding graphs copied from ETSI GS NFV 002. This figure illustrates the concept of a Virtualized Network Function Forwarding Graph (VNF-FG). A VNF-GW describes how a set of VNF's are connected to provide a service.

Figure 16:
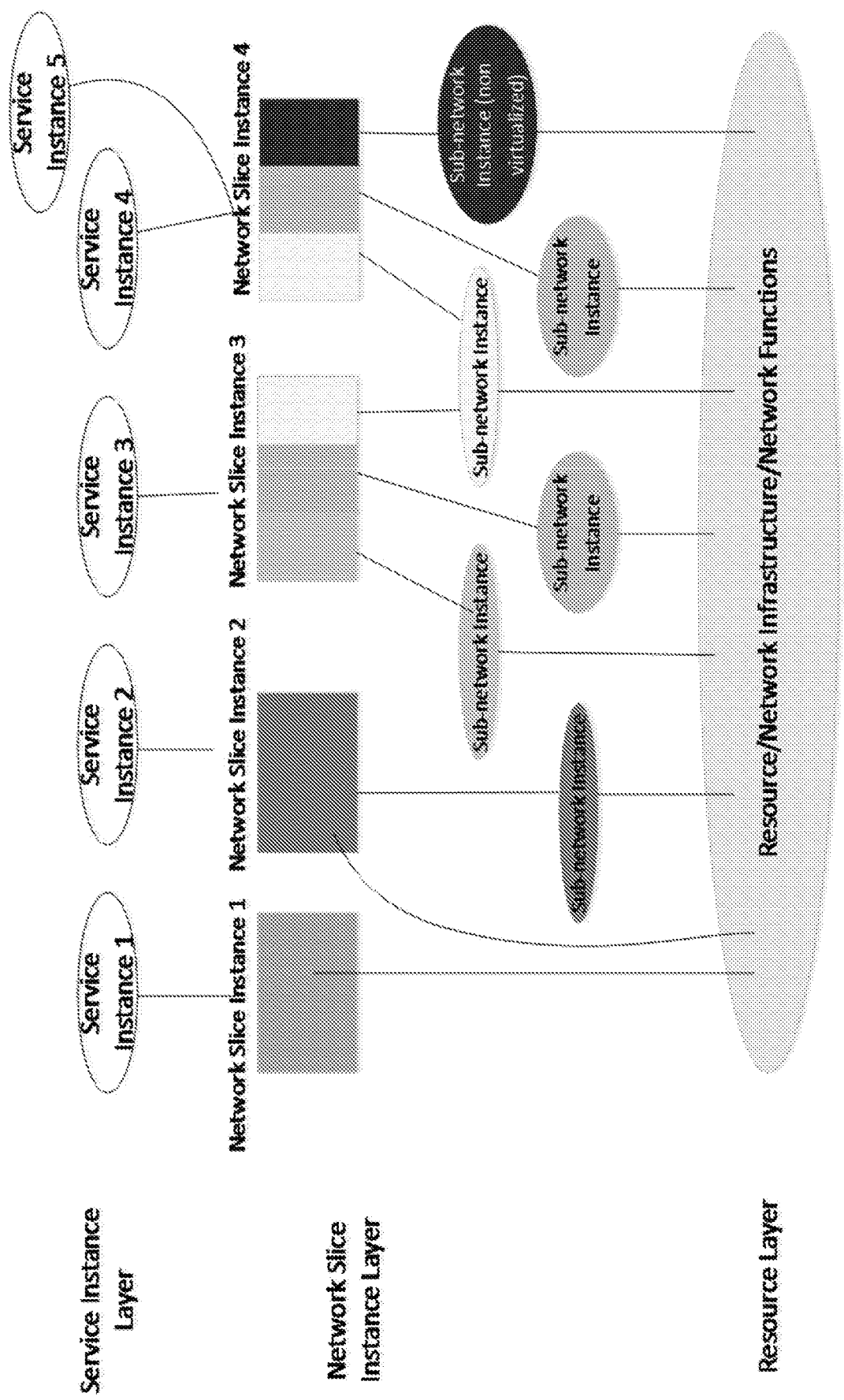
FIG. 16 is a diagram that illustrates a conceptual architecture of network slicing.

Network Slicing, such as described in Next Generation Mobile Network (NGMN) Alliance, "Description of Network Slicing Concept", is a mechanism that could be used by mobile network operators to support multiple 'virtual' networks behind the air interface across the fixed part of the mobile operator's network, both backhaul and core network. This involves 'slicing' the network into multiple virtual networks to support different RANs or different service types running across a single RAN. Network slicing enables the operator to create networks customized to provide optimized solutions for different market scenarios which demands diverse requirements, e.g. in the areas of functionality, performance and isolation. FIG. 16 shows a conceptual architecture of network slicing. Different colors are used to indicate the different network slice instances or sub-network slice instances.

3GPP is designing a 5G network and is considering to incorporate the network slicing technology, which is a good fit for the 5G network. Because the 5G use cases (e.g., massive IoT, critical communications, and enhanced mobile broadband) demand very diverse and sometimes extreme requirements. The current architecture utilizes a relatively monolithic network and transport framework to accommodate a variety of services such as mobile traffic from smart phones, OTT content, feature phones, data cards, and embedded M2M devices. It is anticipated that the current architecture is not flexible and scalable enough to efficiently support a wider range of business need when each has its own specific set of performance, scalability and availability requirements. Furthermore, introduction of new network services should be made more efficient. Nevertheless, several use cases are anticipated to be active concurrently in the same operator network, thus requiring a high degree of flexibility and scalability of the 5G network.

Network slicing enables the operator to create networks customized to provide optimized solutions for different market scenarios which demands diverse requirements, e.g. in the areas of functionality, performance and isolation. However, there are some challenges and issues to support network slicing in the future 5G network:

How to achieve isolation/separation between network slice instances and which levels and types of isolation/separation will be required;

How and what type of resource and network function sharing can be used between network slice instances;

How to enable a UE to simultaneously obtain services from one or more specific network slice instances of one operator;

What is within 3GPP scope with regards to Network Slicing (e.g. network slice creation/composition, modification, deletion);

Which network functions may be included in a specific network slice instance, and which network functions are independent of network slices;

The procedure(s) for selection of a particular Network Slice for a UE;

How to support Network Slicing Roaming scenarios;

How to enable operators to use the network slicing concept to efficiently support multiple 3rd parties (e.g. enterprises, service providers, content providers, etc.) that require similar network characteristics.

More details (i.e., issues, problems and possible solutions) could be found in 3GPP TR 23.799, Study on Architecture for Next Generation System about how 3GPP applies the network slicing in the 5G network architecture.

Figure 17:
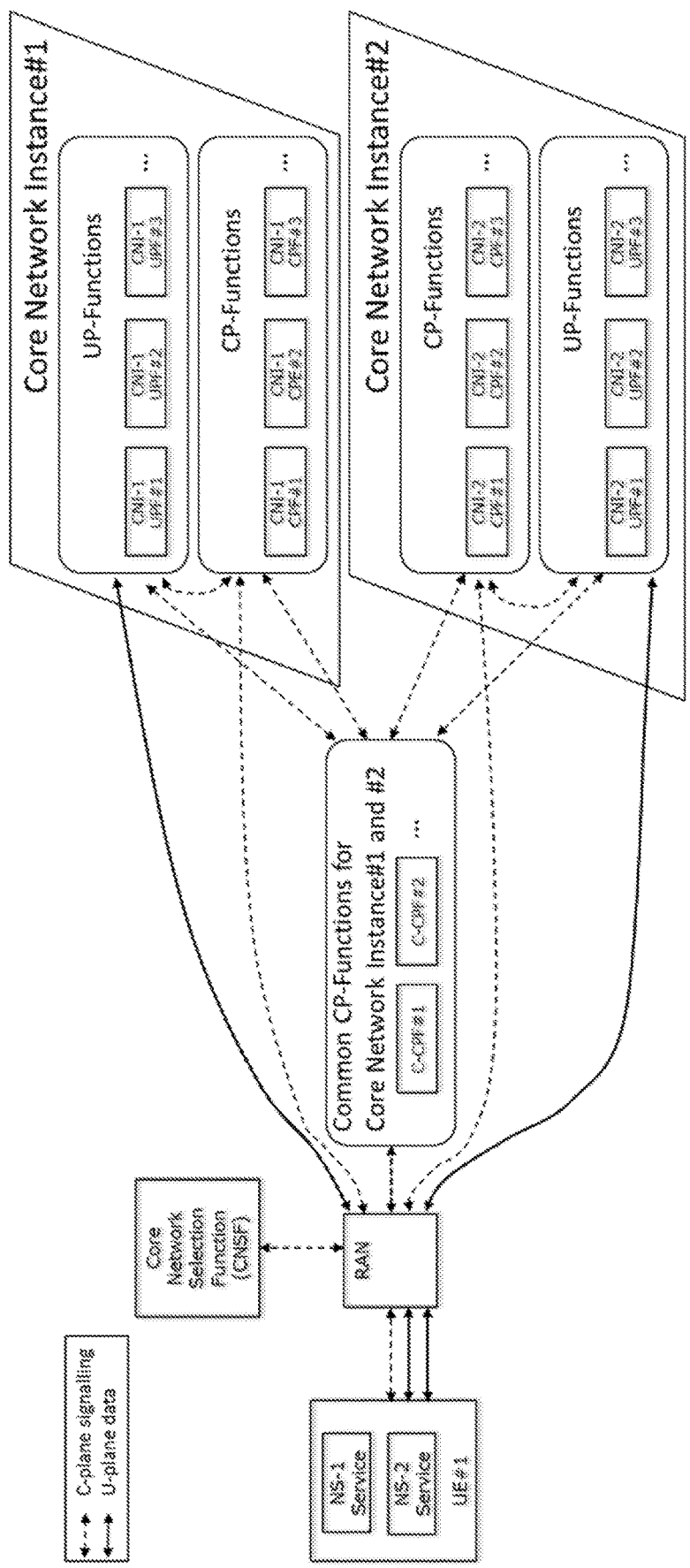
FIG. 17 is a diagram that illustrates CNSF in Selecting Multiple Network Slice Instances.

To enable a UE to simultaneously obtain services from multiple Network Slices of one network operator, a single set of Control Plane Functions is shared across multiple Core Network Instances as shown in FIG. 17. This figure was copied from 3GPP S2-162259, update of solution for support of multiple connections to multiple network slices.

A Core Network Instance consists of a single set of Control Plane Functions and a single set of User Plane Functions. Moreover, a Core Network Instance is dedicated for the UEs that are belonging to the same UE type. Identifying the UE type is done by using a specific parameter, e.g., the UE Usage Type, and/or an information from the UE's subscription. A set of User Plane Functions in a Core Network Instance is responsible for providing a specific service to the UE and for transports the User Plane data of the specific service. For example, one set of User Plane functions in Core Network Instance #1 provides an enhanced mobile broadband service to the UE, whereas another set of User Plane functions in Core Network Instance #2 provides a critical communication service to the UE. When a UE first connects to the operator's Network, a default Core Network Instance that matches to the UE Usage Type is assigned to the UE. Each UE can have multiple User Plane connections to different sets of User Plane Function that are available at different Core Network Instances simultaneously. Control Plane functions may be shared across network slices.

The Core Network Selection Function (CNSF) is responsible for:

Selecting which Core Network Instance to accommodate the UE by taking into account the UE's subscription and the specific parameter, e.g., the UE Usage Type.

Selecting which Control Plane Functions within the selected Core Network Instance that the Base Station should communicate with. This selection of Control Plane Functions is done by using the specific parameter, e.g., UE Usage Type.

Selecting which set of User Plane Functions that the Base Station should establish the connection for transporting User Plane data of different services. This selection of User Plane Function is done by using the specific parameter, e.g., UE Usage Type and the Service Type.

Figure 18:
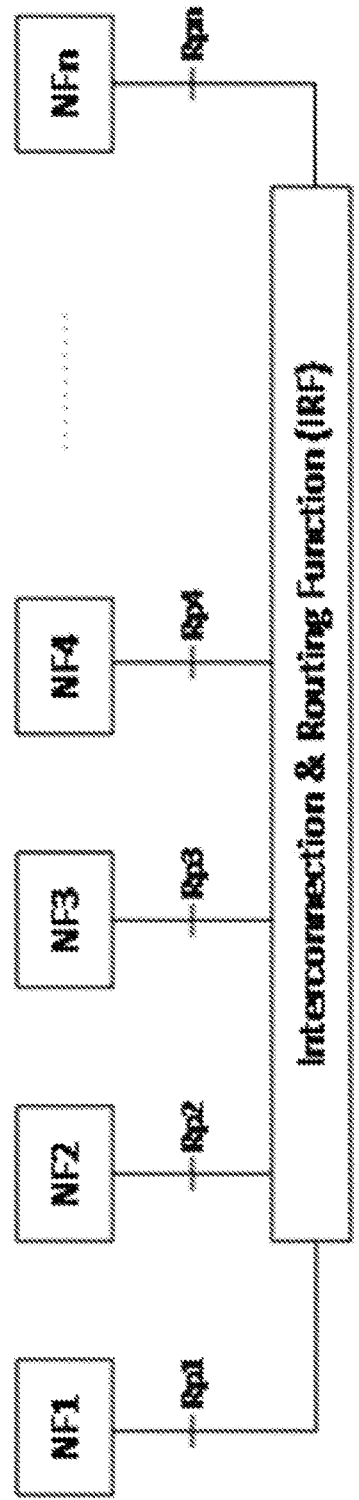
FIG. 18 is a diagram that illustrates a Non-roaming Reference Model for the Interconnection of Network Functions.
Figure 19:
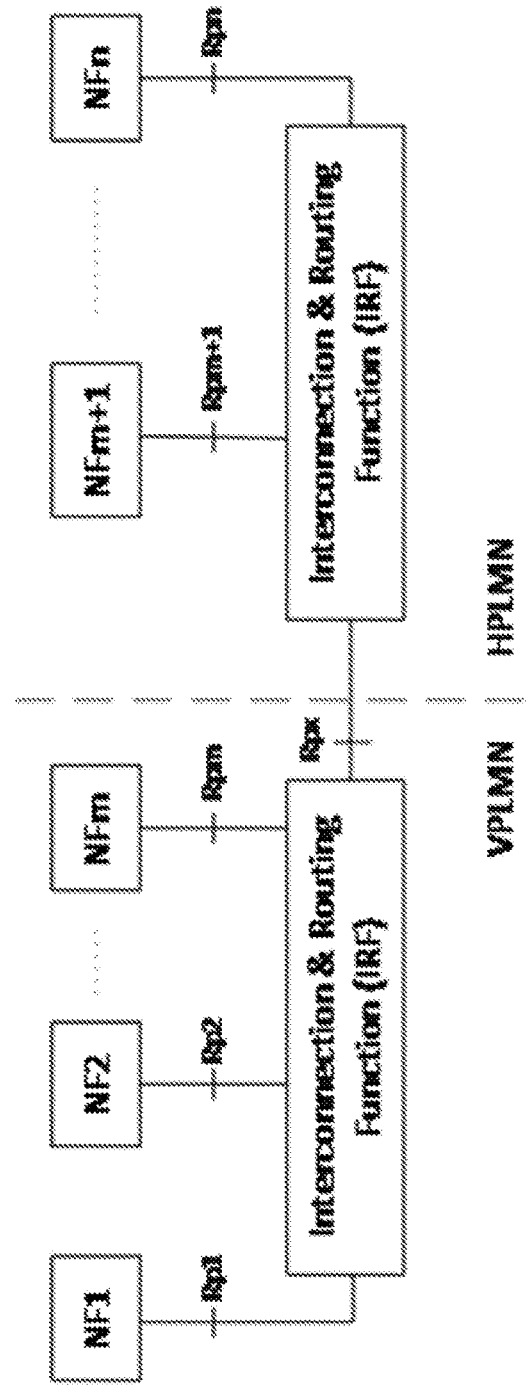
FIG. 19 is a diagram that illustrates a roaming reference model for the interconnection of network functions.

To enable the interconnection of network functions, the Interconnection & Routing Function (IRF) 2058 is proposed in 3GPP TR 23.799, Study on Architecture for Next Generation System. FIG. 18 and FIG. 19 show the reference models of IRF 2058 for non-roaming and roaming scenarios respectively. The functions of IRF 2058 include:

Stores the binding between UE's identity and the interface layer identity (e.g. instance number) of each serving NF, which has an active session for the UE. For the NFs, which do not interface with the IRF 2058 directly, e.g. in roaming scenario, the IRF 2058 stores the identity of the remote-PLMN's IRF 2058 via which those NFs are reachable.

Updates the binding repository when the identity of the serving NF changes for a given UE, e.g. due to UE mobility, load re-balancing (i.e. scale-in or scale-out of virtual machines) or restoration reasons.

Examines the message header to determine the identity of the UE (for which message is sent) and the destination NF. For UE's identity, looks up the internal binding repository to determine the interface layer identity (e.g. instance number) of the destination NF or the identity of the remote IRF 2058. Routes the message accordingly.

Optionally performs authorization of the message based on the operator's configuration, e.g. if operator's configuration prohibits NF1 from sending certain message (such as "change of UE's APN-AMBR") towards NF4 then the IRF 2058 rejects the corresponding message. Optionally protects NFs during a signaling storm by performing overload control, e.g. pacing of messages sent to a given NF based on its load/overload condition.

Each NF interfaces with the IRF 2058 via a given reference point in its own PLMN. NFs do not interface with each other directly but can communicate (i.e. send request or response message) with each other via IRF 2058. Thus, when required, this model allows any NF to communicate with any other NF directly without involving any other unrelated network functions in the path, e.g. NF1 can send message to NF3 via IRF 2058 without involving NF2 if the involvement of NF2 is not needed.

Example M2M/IoT/WoT Communication System

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a-service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

FIG. 14A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as SCEF 102, PCRF 102, PCEF 206, SPR 204, AS 202, MME 304, HSS 302, UE 402, S-GW 406, P-GW 404, CSE 502, CSF, U-SCEF 902, N-API 904, S-API 906, EPC 908, EPC Internetworking service 1002, and logical entities to produce GUIs such as GUI 1302.

As shown in FIG. 14A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

Further, the communication network 12 may comprise other networks such as a core network, the Internet, a sensor network, an industrial control network, a personal area network, a fused personal network, a satellite network, a home network, or an enterprise network for example.

As shown in FIG. 14A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 14B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as SCEF 102, PCRF 102, PCEF 206, SPR 204, AS 202, MME 304, HSS 302, UE 402, S-GW 406, P-GW 404, CSE 502, CSF, U-SCEF 902, N-API 904, S-API 906, EPC 908, EPC Internetworking service 1002, and logical entities to produce GUIs such as GUI 1302. The M2M service layer 22 may be implemented by one or more servers, computers, devices, virtual machines (e.g. cloud/storage farms, etc.) or the like, including for example the devices illustrated in FIGS. 14C and 14D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12 in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 14B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through networks 12 in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as SCEF 102, PCRF 102, PCEF 206, SPR 204, AS 202, MME 304, HSS 302, UE 402, S-GW 406, P-GW 404, CSE 502, CSF, U-SCEF 902, N-API 904, S-API 906, EPC 908, EPC Internetworking service 1002, and logical entities to produce GUIs such as GUI 1302 may be hosted within a M2M service layer instance hosted by an M2M node, such as an M2M server, M2M gateway, or M2M device, as shown in FIG. 14B. For example, the logical entities such as SCEF 102, PCRF 102, PCEF 206, SPR 204, AS 202, MME 304, HSS 302, UE 402, S-GW 406, P-GW 404, CSE 502, CSF, U-SCEF 902, N-API 904, S-API 906, EPC 908, EPC Internetworking service 1002, and logical entities to produce GUIs such as GUI 1302 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 14C or FIG. 14D described below.

Further, logical entities such as SCEF 102, PCRF 102, PCEF 206, SPR 204, AS 202, MME 304, HSS 302, UE 402, S-GW 406, P-GW 404, CSE 502, CSF, U-SCEF 902, N-API 904, S-API 906, EPC 908, EPC Internetworking service 1002, and logical entities to produce GUIs such as GUI 1302 can implemented as part of an M2M network that uses a Service Oriented Architecture (SOA) and/or a Resource-Oriented Architecture (ROA) to access services of the present application.

FIG. 14C is a block diagram of an example hardware/software architecture of a M2M network node 30, such as an M2M device 18, an M2M gateway 14, an M2M server, or the like. The node 30 can execute or include logical entities such as SCEF 102, PCRF 102, PCEF 206, SPR 204, AS 202, MME 304, HSS 302, UE 402, S-GW 406, P-GW 404, CSE 502, CSF, U-SCEF 902, N-API 904, S-API 906, EPC 908, EPC Internetworking service 1002, and logical entities to produce GUIs such as GUI 1302.

The device 30 can be part of an M2M network as shown in FIG. 14A-B or part of a non-M2M network. As shown in FIG. 14C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 14C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 14C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 14C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52. Alternately, the node 30 may comprise apparatuses or devices, such as a sensor, consumer electronics, a wearable device such as a smart watch or smart clothing, a medical or eHealth device, a robot, industrial equipment, a drone, a vehicle such as a car, truck, train, or airplane.

FIG. 14D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as SCEF 102, PCRF 102, PCEF 206, SPR 204, AS 202, MME 304, HSS 302, UE 402, S-GW 406, P-GW 404, CSE 502, CSF, U-SCEF 902, N-API 904, S-API 906, EPC 908, EPC Internetworking service 1002, and logical entities to produce GUIs such as GUI 1302. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 14A and FIG. 14B, to enable the computing system 90 to communicate with other nodes of the network.

User equipment (UE) can be any device used by an end-user to communicate. It can be a hand-held telephone, a laptop computer equipped with a mobile broadband adapter, or any other device. For example, the UE can be implemented as the M2M terminal device 18 of FIGS. 14A-B or the device 30 of FIG. 14C.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as SCEF 102, PCRF 102, PCEF 206, SPR 204, AS 202, MME 304, HSS 302, UE 402, S-GW 406, P-GW 404, CSE 502, CSF, U-SCEF 902, N-API 904, S-API 906, EPC 908, EPC Internetworking service 1002, and logical entities to produce GUIs such as GUI 1302 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. A user equipment (UE) comprising a processor, a memory, and communication circuitry, the UE being connected to a network via its communication circuitry, the UE further comprising computer-executable instructions stored in the memory of the UE which, when executed by the processor of the UE, cause the UE to perform operations comprising:
   receiving information from an application that is located at the UE;
   sending a request to the network to establish a connection with a core network service exposure function;
   sending a message containing the information to the core network service exposure function; and
   receiving a response from the core network service exposure function.

2. The UE of claim 1, further comprising:
   sending a request to authenticate with the core network service exposure function.

3. The UE of claim 1, wherein the message indicates a desired schedule.

4. The UE of claim 3, wherein the desired schedule reflects input from multiple applications at the UE.

5. The UE of claim 1, wherein the message indicates mobility information for the UE.

6. The UE of claim 1, wherein the UE includes a service exposure function.

7. The UE of claim 6, wherein the UE service exposure function interacts with the core network service exposure function.

8. The UE of claim 7, wherein the UE service exposure function provides a reference number to the core network service exposure function and the response from the core network service exposure function to the UE includes the reference number.

9. The UE of claim 8, wherein the UE provides the reference number to the Core Network in a Session Management or Mobility Management message.

10. The UE of claim 1, wherein the response includes a schedule.

11. The UE of claim 10, wherein the UE communicates using the schedule.

12. The UE of claim 1, wherein the response includes one or more mobility management timer values.

13. The UE of claim 12, wherein the UE sends the one or more mobility management timer values to the core network.

14. The UE of claim 1, wherein the message indicates battery level information for the UE.

15. A method for use by a user equipment (UE), wherein the UE comprises a processor, a memory, and communication circuitry, the UE being connected to a network via its communication circuitry, the UE further comprising computer-executable instructions stored in the memory of the UE which, when executed by the processor, perform functions of a method comprising:
   receiving information from an application that is located at the UE;
   sending a request to the network to establish a connection with a core network service exposure function;
   sending a message containing the information to the core network service exposure function; and
   receiving a response from the core network service exposure function.

16. The method of claim 15, further comprising:
   sending a request to authenticate with the core network service exposure function.

17. The method of claim 15, wherein the message indicates a desired schedule.

18. The method of claim 17, wherein the desired schedule reflects input from multiple applications at the UE.

19. The method of claim 15, wherein the message indicates mobility information for the UE.

20. The method of claim 15, wherein the UE includes a UE service exposure function.

* * * * *